US012666448B2

(12) United States Patent
Baek et al.

(10) Patent No.: US 12,666,448 B2
(45) Date of Patent: Jun. 23, 2026

(54) METHOD AND DEVICE FOR MBS COMMUNICATION IN WIRELESS COMMUNICATION SYSTEM

(71) Applicant: Samsung Electronics Co., Ltd., Gyeonggi-do (KR)

(72) Inventors: Sangkyu Baek, Gyeonggi-do (KR); Anil Agiwal, Gyeonggi-do (KR); Soenghun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 279 days.

(21) Appl. No.: 18/032,468

(22) PCT Filed: Oct. 21, 2021

(86) PCT No.: PCT/KR2021/014804
§ 371 (c)(1),
(2) Date: Apr. 18, 2023

(87) PCT Pub. No.: WO2022/086213
PCT Pub. Date: Apr. 28, 2022

(65) Prior Publication Data
US 2023/0397232 A1 Dec. 7, 2023

(30) Foreign Application Priority Data

Oct. 21, 2020 (KR) ........................ 10-2020-0137048

(51) Int. Cl.
*H04W 72/30* (2023.01)
*H04W 72/0457* (2023.01)
(Continued)

(52) U.S. Cl.
CPC ....... *H04W 72/30* (2023.01); *H04W 72/0457* (2023.01); *H04W 72/231* (2023.01); *H04W 76/28* (2018.02)

(58) Field of Classification Search
CPC . H04W 4/06; H04W 72/0457; H04W 72/231; H04W 72/30; H04W 76/28; H04W 76/40
See application file for complete search history.

(56) References Cited

U.S. PATENT DOCUMENTS 10,813,137 B2 10/2020 Shih et al.
2021/0167930 A1 6/2021 Jeon et al.
(Continued)

FOREIGN PATENT DOCUMENTS

EP 3 611 866 2/2020
KR 10-2019-0070841 6/2019
(Continued)

OTHER PUBLICATIONS

3GPP TS 38.321 V16.2.1, 3rd Generation Partnership Project; Technical Specification Group Radio Access Network; NR; Medium Access Control (MAC) Protocol Specification (Release 16), Sep. 2020, 75 pages.
(Continued)

*Primary Examiner* — Awet Haile
(74) *Attorney, Agent, or Firm* — The Farrell Law Firm, P.C.

(57) ABSTRACT

The present disclosure relates to a communication technique for converging, with an IoT technology, a 5G communication system for supporting a higher data transmission rate than a 4G system, and a system therefor. The present disclosure relates to a method performed by a terminal which receives a multicast and broadcast service (MBS) in a wireless communication system, and the method may comprise the steps of: receiving, from a base station, downlink control information (DCI) based on a specific radio network temporary identifier (RNTI) related to the MBS; and starting a bandwidth part (BWP) deactivation timer in
(Continued)

response to reception of the DCI, wherein the specific RNTI includes a group-RNTI (G-RNTI).

8 Claims, 19 Drawing Sheets

(51) Int. Cl.
| | | |
|---|---|---|
| *H04W 72/231* | (2023.01) | |
| *H04W 76/28* | (2018.01) | |

(56) References Cited

U.S. PATENT DOCUMENTS

| | | | | |
|---|---|---|---|---|
| 2023/0014481 A1* | 1/2023 | Wu | .................... | H04W 72/0453 |
| 2023/0049868 A1* | 2/2023 | Zhou | .................... | H04L 5/0098 |
| 2023/0137551 A1* | 5/2023 | Wang | ...................... | H04W 4/06 |
| | | | | 370/312 |
| 2023/0163896 A1* | 5/2023 | Lin | ...................... | H04L 1/1858 |
| | | | | 370/312 |
| 2023/0239901 A1* | 7/2023 | Deng | .................... | H04W 72/30 |
| | | | | 370/312 |

FOREIGN PATENT DOCUMENTS

| | | |
|---|---|---|
| KR | 10-2021-0137880 | 11/2021 |
| KR | 10-2022-0008231 | 1/2022 |
| WO | WO 2019/0844570 | 5/2019 |
| WO | WO 2021/139747 | 7/2021 |

OTHER PUBLICATIONS

Qualcomm Incorporated, "View on Group Scheduling for Multicast RRC_CONNECTED UEs", R1-2006830, 3GPP TSG RAN WG1 #102-e, Aug. 17-28, 2020, 6 pages.

European Search Report dated Feb. 2, 2024 issued in counterpart application No. 21883281.4-1215, 12 pages.

PCT/ISA/210 Search Report issued on PCT/KR2021/014804, Jan. 20, 2022 pp. 5.

PCT/ISA/237 Written Opinion issued on PCT/KR2021/014804, Jan. 20, 2022 pp. 3.

ZTE, "Mechanisms to Support Group Scheduling for RRC_CONNECTED UEs", R1-2005436, 3GPP TSG RAN WG1 Meeting #102-e, e-Meeting, Aug. 8, 2020, pp. 9.

Moderator (CMCC), "Summary#3 on NR Multicast and Broadcast Services", R1-2007341, 3GPP TSG RAN WG1 #102-e, e-Meeting, Aug. 29, 2020, pp. 69.

ASUSTek, "Discussion on clarification of BWP inactivity timer operation", R2-2005555, 3GPP TSGRAN WG2 Meeting #110 electronic, Online, May 22, 2020, pp. 5.

3GPP TS 36.331 V16.0.0 (Mar. 2020) 3rd Generation Partnership Project; Technical Specification Group Radio Access Network; Evolved Universal Terrestrial Radio Access (E-UTRA); Radio Resource Control (RRC); Protocol specification (Release 16) Apr. 6, 2020, pp. 1048.

Vivo, "Other Issues for Rel-17 MBS", R1-2006658, 3GPP TSG RAN WG1 #102-e, Aug. 17-28, 2020, 3 pages.

Ericsson, "SPS and BWP Inactivity Timer Interaction", R2-1800334, 3GPP TSG-RAN WG2 #AH NR 1801, Jan. 22-26, 2018, 3 pages.

Korean Office Action dated Nov. 13, 2025 issued in counterpart application No. 10-2020-0137048, 14 pages.

EP Communication Report dated Mar. 17, 2026 issued in counterpart application No. 21883281.4-1206, 10 pages.

* cited by examiner

METHOD AND DEVICE FOR MBS COMMUNICATION IN WIRELESS COMMUNICATION SYSTEM

PRIORITY

This application is a National Phase Entry of PCT International Application No. PCT/KR2021/014804, which was filed on Oct. 21, 2021, and claims priority to Korean Patent Application No. 10-2020-0137048, which was filed on Oct. 21, 2020, the entire content of each of which is incorporated herein by reference.

TECHNICAL FIELD

The disclosure relates to a wireless communication system and, more particularly, to a technique of discontinuous reception (DRX) and bandwidth part (BWP) deactivation for multicast and broadcast services (MBS) communication in a wireless communication system.

BACKGROUND ART

To meet the ever increasing demand for wireless data traffic since the commercialization of $4^{th}$ generation (4G) communication systems, efforts have been made to develop improved $5^{th}$ generation (5G) or pre-5G communication systems. As such, 5G or pre-5G communication systems are also called "beyond 4G network system" or "post Long Term Evolution (LTE) system".

To achieve high data rates, 5G communication systems are being considered for implementation in the extremely high frequency (mmWave) band (e.g., 60 GHz band). To decrease path loss of radio waves and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems.

To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multipoints (CoMP), interference cancellation, and the like.

Additionally, advanced coding and modulation (ACM) schemes such as hybrid frequency shift keying and quadrature amplitude modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G systems.

Meanwhile, the Internet is evolving from a human centered network where humans create and consume information into the Internet of Things (IoT) where distributed elements such as things exchange and process information. There has also emerged the Internet of Everything (IoE) technology that combines IoT technology with big data processing technology through connection with cloud servers. To realize IoT, technology elements related to sensing, wired/wireless communication and network infrastructure, service interfacing, and security are needed, and technologies interconnecting things such as sensor networks, machine-to-machine (M2M) or machine type communication (MTC) are under research in recent years. In IoT environments, it is possible to provide intelligent Internet technology services, which collect and analyze data created by interconnected things to add new values to human life. Through convergence and combination between existing information technologies and various industries, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, technologies such as sensor networks and machine-to-machine (M2M) or machine type communication (MTC) are being realized by use of 5G communication technologies including beamforming, MIMO, and array antennas. Application of cloud RANs as a big data processing technique described above may be an instance of convergence of 5G technology and IoT technology.

Meanwhile, various methods for performing multicast and broadcast services (MBS) communication in a 5G system are being sought.

DISCLOSURE OF INVENTION

Technical Problem

The disclosure provides a discontinuous reception (DRX) technology for multicast and broadcast system (MBS) communication in a wireless communication system.

In addition, the disclosure provides a bandwidth part (BWP) deactivation technique for MBS communication in a wireless communication system.

Solution to Problem

According to the disclosure, a method performed by a terminal capable of receiving a multicast and broadcast service (MBS) in a wireless communication system may include: receiving downlink control information (DCI) based on a specific radio network temporary identifier (RNTI) from a base station; and starting a bandwidth part (BWP) inactivity timer in response to receiving the DCI, wherein the specific RNTI may include a group-RNTI (G-RNTI).

According to the disclosure, a terminal capable of receiving an MBS in a wireless communication system may include: at least one transceiver; and at least one processor, wherein the at least one processor may be configured to receive DCI based on a specific RNTI from a base station, and start a BWP inactivity timer in response to receiving the DCI, and wherein the specific RNTI may include a G-RNTI.

According to the disclosure, a method performed by a terminal capable of receiving an MBS in a wireless communication system may include: receiving DCI based on a G-RNTI from a base station; transmitting a response to a PDSCH scheduled by the DCI to the base station based on a HARQ feedback timing included in the DCI; starting a hybrid automatic repeat request (HARQ) round trip time (RTT) timer in response to transmitting the response to the base station; starting a discontinuous reception (DRX) retransmission timer for the MBS when the HARQ RTT timer expires; and monitoring the PDCCH based on the G-RNTI while the DRX retransmission timer is running, wherein the G-RNTI may be assigned to one or more terminals receiving the MBS and the HARQ feedback timing may be assigned to the one or more terminals.

According to the disclosure, a method performed by a terminal capable of receiving an MBS in a wireless communication system may include: receiving DCI based on a G-RNTI from a base station; starting a HARQ RTT timer based on the start time of the HARQ RTT timer; starting a DRX retransmission timer for the MBS when the HARQ RTT timer expires; and monitoring the PDCCH based on the G-RNTI while the DRX retransmission timer is running, wherein the G-RNTI may be assigned to one or more terminals receiving the MBS and the start time of the HARQ RTT timer may be assigned to the one or more terminals.

According to the disclosure, a method performed by a terminal capable of receiving an MBS in a wireless communication system may include: receiving DCI based on a G-RNTI from a base station; starting a HARQ RTT timer in response to receiving the DCI; starting a DRX retransmission timer for the MBS when the HARQ RTT timer expires; and monitoring the PDCCH based on the G-RNTI while the DRX retransmission timer is running.

Advantageous Effects of Invention

According to the disclosure, a terminal can perform efficient multicast and broadcast services (MBS) communication in a 5G communication system.

In addition, according to the disclosure, resources can be efficiently utilized by aligning MBS retransmission scheduling regions of one or more terminals receiving MBS.

In addition, according to the disclosure, the MBS can be continuously provided by determining whether the MBS is configured in the active BWP and the default BWP when the bandwidth part (BWP) inactivity timer expires.

BRIEF DESCRIPTION OF DRAWINGS

FIG. 2H illustrates an operation process when an MBS BWP inactivity timer and a unicast BWP inactivity timer coexist according to an embodiment of the disclosure.

MODE FOR THE INVENTION

Figure 1A:
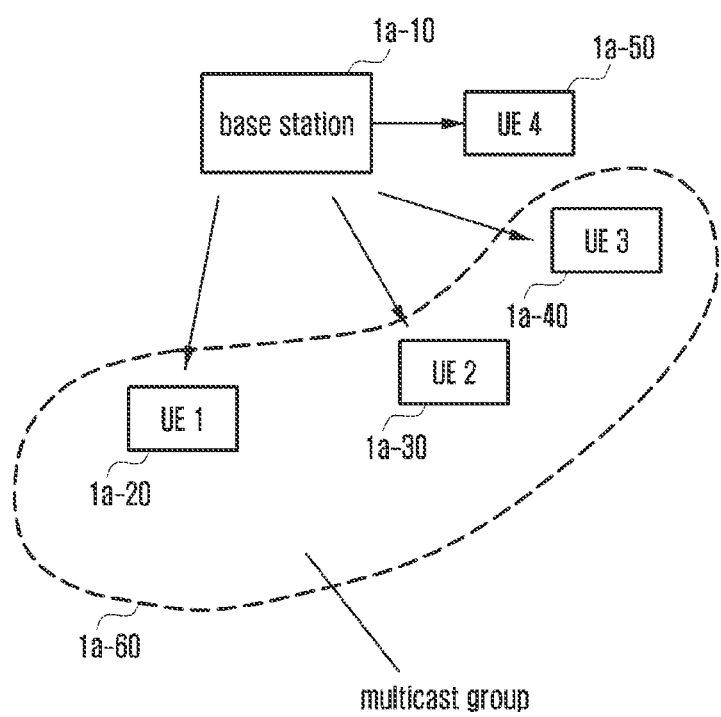
FIG. 1A is a diagram illustrating an operating scheme of multicast and broadcast services (MBS) communication according to various embodiments of the disclosure.

Hereinafter, exemplary embodiments of the disclosure will be described in detail with reference to the accompanying drawings. Here, it should be noted that the same components are denoted by the same reference symbols as much as possible in the accompanying drawings. In addition, detailed descriptions of well-known functions and configurations that may obscure the gist of the disclosure will be omitted.

In the following description of embodiments of the present specification, descriptions of technical details well known in the art and not directly related to the disclosure may be omitted. This is to more clearly convey the subject matter of the disclosure without obscurities by omitting unnecessary descriptions.

Likewise, in the drawings, some elements are exaggerated, omitted, or only outlined in brief. Also, the size of each element does not necessarily reflect the actual size. The same or similar reference symbols are used throughout the drawings to refer to the same or like parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the description to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Further, each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit", "module", or the like used in the embodiments may refer to a software component or a hardware component such as an FPGA or ASIC capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Further, components and units may be implemented to drive one or more processors or CPUs in a device or a secure multimedia card.

In describing the embodiments of the disclosure in detail, the main focus is placed on the radio access network (new RAN (NR)) and the packet core (5G system, 5G core network, or next generation core (NG core)) being the core network according to the 5G mobile communication standards specified by 3rd Generation Partnership Project (3GPP) being a mobile communication standardization organization, but it should be understood by those skilled in the art that the subject matter of the disclosure is applicable to other communication systems having similar technical backgrounds without significant modifications departing from the scope of the disclosure.

For convenience of description, some terms and names defined in the 3GPP standards (standards of 5G, NR, LTE, or similar systems) may be used. However, the disclosure is not limited by these terms and names, and may be equally applied to systems conforming to other standards.

In the following description, a physical channel or a signal may be used interchangeably with data or a control signal. For example, a physical downlink shared channel (PDSCH) is a term referring to a physical channel through which data is transmitted, but the PDSCH may also be used to refer to data. That is, in the disclosure, an expression "transmitting a physical channel" may be interpreted as being equivalent to an expression "transmitting data or a signal through a physical channel".

In the disclosure, higher signaling indicates a method of transmitting a signal from the base station to the UE by using a downlink data channel of the physical layer, or from the UE to the base station by using an uplink data channel of the physical layer. Higher signaling may be understood as radio resource control (RRC) signaling or medium access control (MAC) control element (CE).

Also, in the disclosure, to determine whether a specific condition is satisfied or fulfilled, an expression such as 'greater than' or 'less than' may be used, but this is illustrative and does not exclude the use of 'greater than or equal to' or 'less than or equal to'. 'Greater than or equal to', 'less than or equal to', and 'greater than or equal to and less than' may be replaced with 'greater than', 'less than', and 'greater than and greater than or equal to', respectively.

In addition, although the disclosure describes embodiments using terms used in some communication standards (e.g., 3rd generation partnership project (3GPP)), this is only an example for description. The embodiments of the disclosure may be applied to other communication systems with easy modifications.

FIG. 1A is a diagram illustrating an operating scheme of MBS communication according to various embodiments of the disclosure. Multicast and broadcast services (MBS) communication refers to a scheme in which one transmitting device communicates with one or more receiving devices in a wireless communication system.

Here, the transmitting device may be a base station, and each receiving device may be a terminal or UE. However, without being limited thereto, the transmitting device may be a UE.

The embodiment of FIG. 1A illustrates an example of performing MBS communication when a base station 1a-10 is a transmitter and UEs 1a-20, 1a-30, 1a-40, 1a-50 are receivers. MBS communication may be performed in a broadcast scheme for many unspecified receivers, and may be performed in a multicast scheme for many specified receivers. If communication is performed in a multicast scheme, the base station may configure specific UEs to receive a corresponding multicast packet. To this end, a set of specific UEs to perform multicast communication may be defined, and this is referred to as a multicast group 1a-60 in the embodiment of FIG. 1A. On the other hand, a scheme of one-to-one communication between a base station and a UE is called unicast. The UEs belonging to a multicast group may be assigned the same group-radio network temporary identity (G-RNTI), which is a resource identifier for each multicast group, to receive data allocated with the G-RNTI. Such a G-RNTI is an RNTI shared by UEs belonging to a multicast group, and those UEs that have received a G-RNTI can receive a radio resource for an MBS service from the base station. It is assumed in the embodiment of FIG. 1A that UE 1 (1a-20), UE 2 (1a-30), and UE 3 (1a-40) are configured as one multicast group and are assigned a G-RNTI to receive data from the base station 1a-10 in a multicast manner. As UE 4 (1a-50) is not included in the multicast group, it is not assigned the G-RNTI; hence, UE 4 (1a-50) cannot receive the data that UE 1 (1a-20), UE 2 (1a-30), and UE 3 (1a-40) receive from the base station.

One or more multicast groups may be defined within the coverage of the base station 1a-10, and one multicast group may be identified by a G-RNTI. One UE may be assigned one or more G-RNTIs from the base station 1a-10. The UE may receive multicast data by using a G-RNTI value assigned in connected mode (radio resource control (RRC) connected mode) not only in connected mode but also in idle mode (RRC idle mode) or inactive mode (RRC inactive mode). The G-RNTI may be included in at least one of an RRC reconfiguration message, an RRC setup message, or an RRC reestablishment message in connected mode of the UE.

However, without being limited thereto, the G-RNTI may be transmitted from the base station by being included in a system information block (SIB) as a G-RNTI value that can be received by a UE. The UE having been configured with a G-RNTI value may apply the G-RNTI value thereafter.

Figure 1B:
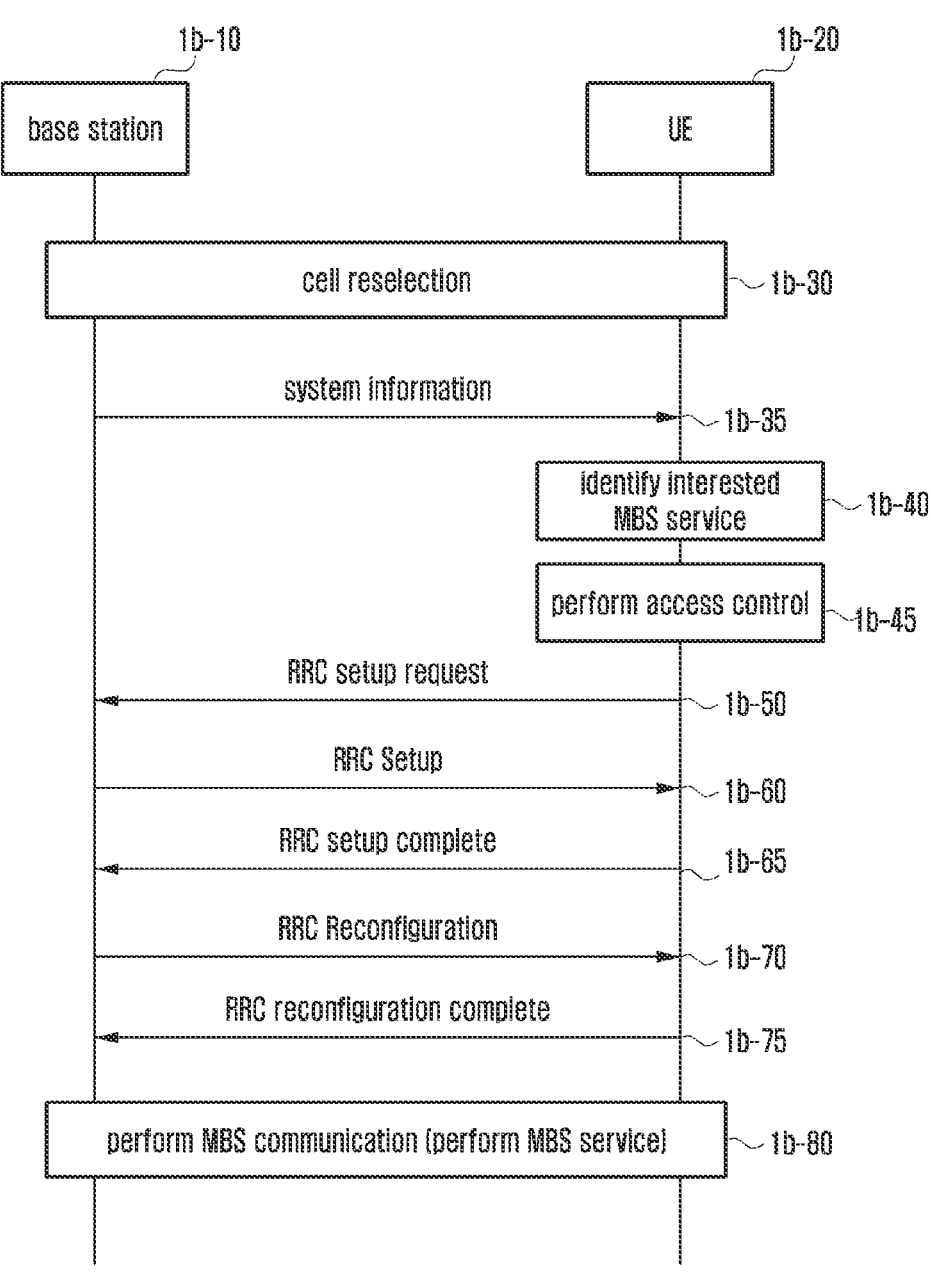
FIG. 1B is a diagram illustrating a configuration procedure for performing MBS communication according to various embodiments of the disclosure.

FIG. 1B is a diagram illustrating a configuration procedure for performing multicast and broadcast services (MBS) communication according to various embodiments of the disclosure. The UE 1b-20, which is not in radio resource control (RRC) connected state with the base station 1b-10, may select a base station to request an MBS service for performing MBS communication. At step 1b-30, the UE 1b-20 may perform a cell selection or reselection procedure for receiving synchronization signals transmitted from base stations and selecting a base station with a strong received signal. In the embodiment of FIG. 1B, it is assumed that a UE that has transitioned to idle mode or inactive mode from initial connected state performs a cell reselection operation for selecting a cell.

At step 1b-35, the UE 1b-20 may receive a system information block (SIB) from the selected cell. Here, if the UE 1b-20 intends to receive an MBS service, it may receive a system information block including MBS information among system information blocks. The system information block including MBS information may include a list of MBS services that are being provided or can be provided by a serving cell.

Such a list of MBS services that are being provided or can be provided by the serving cell may be referred to as AvailableMBSList. AvailableMBSList may include pieces of MBS session information. The MBS session information may be composed of a temporary mobile group identity (TMGI) value for identifying a group, and an MBS session ID (sessionID). The TMGI value may include a public land mobile network (PLMN) ID (plmn-id) that identifies whether the service is provided by a network operator, and a service ID (serviceID) that identifies the service provided by the network operator. According to an embodiment of the disclosure, AvailableMBSList may have the following structure.

AvailableMBSList=MBSSessionInfoList
MBSSessionInfoList=Sequence of (tmgi, sessionID)
tmgi=(plmn-id, serviceID)

If all UEs request an RRC configuration to receive MBS services, the base station may instantaneously have to establish connections to many UEs, which may cause overload on the base station. Hence, an access control scheme for MBS services may be required. To this end, for each TMGI, an access category value and uac-BarringForAccessIdentity may be set for access control. The base station can utilize the access category and uac-BarringForAccessIdentity set for each TMGI to control the frequency at which a UE requests access to the base station for each TMGI. In the embodiment of FIG. 1B, it is assumed that the UE 1b-20 receives a system information block including MBS information, but various embodiments of the disclosure are not limited to the embodiment of FIG. 1B, and MBS information may be transmitted by a DL Information Transfer message.

Upon receiving the system information block including MBS information at step 1b-35, at step 1b-40, the UE 1b-20 may identify an MBS service of interest from the list of MBS services that are being provided or can be provided by the serving cell. The UE 1b-20 may determine which MBS service the UE 1b-20 is interested in based on whether the MBS service is required by an application of the UE 1b-20 or other conditions. The criterion by which the UE 1b-20 identifies an MBS service may be a TMGI unit. In other words, the UE 1b-20 may check whether the TMGI of the MBS service that the UE 1b-20 intends to receive (or that the UE 1b-20 is interested in) is included in the system information block including MBS information. Specifically, the UE 1b-20 may check whether the TMGI of the MBS service that the UE 1b-20 intends to receive is included in the AvailableMBSList of the system information block including the MBS information. If the TMGI of the MBS service that the UE 1b-20 intends to receive is included in the system information block including the MBS information, the UE 1b-20 may perform a step of establishing an RRC connection to receive the corresponding MBS service.

At step 1b-45, the UE 1b-20 may perform an access control operation to determine whether to initiate RRC connection establishment. The UE 1b-20 may perform access control based on the PLMN ID (plmn-ID) included in the TMGI of the MBS service to be received by using UAC-barring information for the corresponding PLMN ID. The UE 1b-20 may determine whether access is allowed for the uac-BarringForAccessIdentity and access category of the MBS service that the UE 1b-20 intends to receive. If access to this MBS service is allowed, the UE 1b-20 may initiate a procedure for requesting an RRC connection.

If access for receiving the MBS service is allowed for the UE 1b-20, at step 1b-50, the UE 1b-20 may transmit an RRC setup request message to the base station 1b-10. However, the disclosure is not limited by the UE 1b-20 transmitting the RRC setup request message, and an RRC reestablishment request message may also be used for the same purpose as the RRC setup request message. Since the RRC setup request message or the RRC reestablishment request message is a general message that can be used for the UE 1b-20 to transition to connected mode (RRC connected mode), it may include a cause value as to what purpose the UE 1b-20 intends to transition to connected mode. If the UE 1b-20 intends to receive the MBS service, it may transmit, to the base station 1b-10, are RRC setup request or RRC reestablishment request message including a cause value indicating that it intends to set up MBS. However, if the RRC setup request or RRC reestablishment request is not for the UE 1b-20 to receive the MBS service, the UE 1b-20 may transmit an RRC setup or RRC reestablishment request message including a cause value transferred from the upper layer. For example, the cause value transferred from the upper layer may include information related to the non-access stratum (NAS) layer. At step 1b-60, the base station 1b-10 may transmit an RRC setup message to the UE 1b-20 to allow the UE 1b-20 to transition to connected mode. However, the disclosure is not limited by the base station 1b-10 transmitting the RRC setup message, and an RRC reestablishment message may also be used for the same purpose as the RRC setup message. When the UE 1b-20 receives the RRC setup message or RRC reestablishment message, SRB1 may be configured according to the configuration information of signaling radio bearer 1 (SRB1) included in the received message. SRB1 may be a radio bearer for exchanging radio resource control (RRC) messages between the base station 1b-10 and the UE 1b-20.

At step 1b-65, the UE 1b-20 may apply configuration information included in the RRC setup message or RRC reestablishment message, and may transmit an RRC setup complete message or RRC reestablishment complete message to the base station 1b-10 to notify the base station 1b-10 that the configuration received from the base station 1b-10 has been successfully applied. In addition, the RRC setup complete message or RRC reestablishment complete message transmitted at step 1b-65 may include a list of MBS services that the UE 1*b*-20 intends to receive. The MBS service list included in the RRC setup complete message or RRC reestablishment complete message may be a list including TMGI values corresponding to the MBS services that the UE 1*b*-20 intends to receive. Here, the TMGI included in the MBS service list may be all or some of TMGIs included in the list of MBS services that are being provided or can be provided by the serving cell included in the system information block or downlink information transfer message transmitted at step 1*b*-35 by the base station 1*b*-10.

At step 1*b*-70, the base station 1*b*-10 may transmit an RRC reconfiguration message to the UE 1*b*-20. As SRB1 is configured and the list of MBS services that the UE 1*b*-20 intends to receive is transmitted to the base station 1*b*-10 at step 1*b*-65, the base station 1*b*-10 may configure the UE 1*b*-20 to receive the MBS service based on configured SRB1 and the MBS service list. The MBS service set by the base station 1*b*-10 for the UE 1*b*-20 to receive may be configured by using the RRC reconfiguration message transmitted from the base station 1*b*-10 to the UE 1*b*-20. The RRC reconfiguration message may include configuration information for signaling radio bearer 2 (SRB2) used to exchange non-access stratum (NAS) messages, data radio bearer (PRB) used for data transmission and reception, and point-to-multipoint (PTM) DRB used for multicast transmission. The PTM DRB may be configured without distinction from the normal DRB, and may also be configured with a received G-RNTI. In addition, based on the RRC reconfiguration message, a radio link control (RLC) bearer through which the established radio bearer will be transmitted may be configured, and the radio bearer to which this RLC bearer is to be connected may be configured. In the RRC reconfiguration message, a G-RNTI with which UEs belonging to a multicast group can receive multicast data may be set.

The G-RNTI is an RNTI set for reception of a transport block (TB) and may be used to indicate scheduling information for the physical downlink shared channel (PDSCH). This G-RNTI may be set per MAC layer entity, but may also be set per bandwidth part (BWP). If a G-RNTI is set per BWP, the set G-RNTI can be used only when receiving a PDSCH resource of the corresponding BWP. That is, this G-RNTI may be not used in other BWPs. To this end, the G-RNTI may be included in the downlink BWP configuration (BWP-Downlink) field of an RRC message (e.g., at least one of RRC reconfiguration message, RRC setup message, or RRC reestablishment message). In addition, a BWP ID to be used to set the G-RNTI may also be set. In another embodiment, the G-RNTI may be set per cell. If a G-RNTI is set per cell, the set G-RNTI can be used only when receiving a PDSCH resource of the corresponding cell. That is, this G-RNTI may be not used in other cells. To this end, the G-RNTI may be included in the cell configuration field of an RRC message. In addition, a cell ID to be used to set the G-RNTI may also be set.

For reception of an MBS service, a BWP and a search space may be configured separately. Information on the BWP and search space for receiving a specific MBS service may be configured in the UE 1*b*-20 by the base station 1*b*-10, and an MBS BWP and MBS search space may be included in this configuration information. The MBS BWP may refer to a BWP to which the assigned G-RNTI is applied. According to an embodiment, the BWP including a G-RNTI in the BWP-Downlink field may be an MBS BWP. The MBS search space may be a search space whose configuration information includes a downlink control information (DCI) format for MBS reception, or a search space whose configuration information includes an indicator indicating that the search space is for MBS reception. For example, search space configuration information may include a 1-bit indicator indicating whether the corresponding search space is an MBS search space. If the indicator of search space configuration information indicates an MBS search space, the corresponding search space may be an MBS search space and may be used as a search space for monitoring a G-RNTI for MBS reception.

When the UE has applied the content included in the RRC reconfiguration message transmitted at step 1*b*-70 from the base station 1*b*-10 to the UE 1*b*-20, at step 1*b*-75, the UE 1*b*-20 may transmit an RRC reconfiguration complete message to the base station 1*b*-10 to notify the base station 1*b*-10 that the information of the RRC reconfiguration message has been applied. Based on the RRC reconfiguration complete message, at step 1*b*-80, the UE 1*b*-20 may receive a broadcast or multicast packet by performing MBS communication. The UE 220 may receive the MBS service from the base station.

Figure 1C:
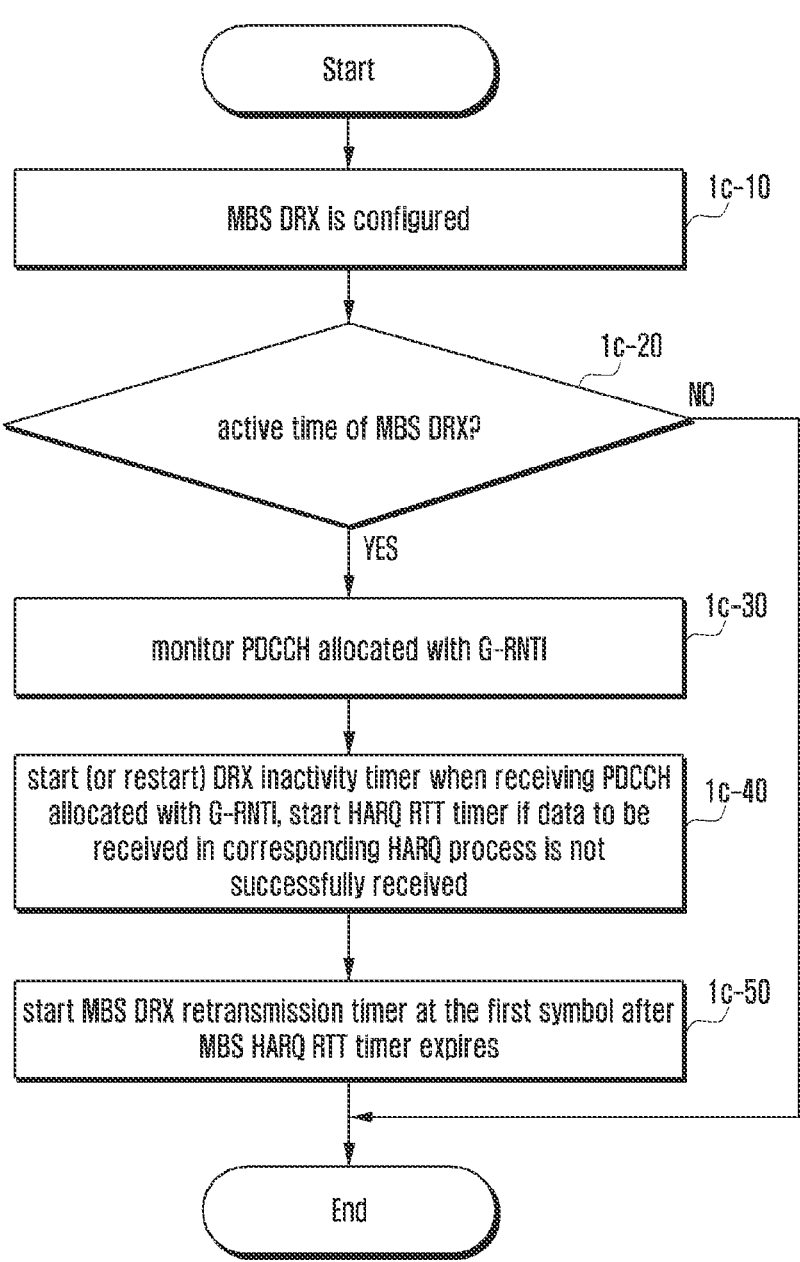
FIG. 1C is a diagram illustrating discontinuous reception (DRX) operation for MBS according to various embodiments of the disclosure.

FIG. 1C is a diagram illustrating DRX operation for MBS according to various embodiments of the disclosure. Multicast and broadcast services (MBS) may be a method in which the base station transmits data to a plurality of UEs through broadcasting or multicasting. To reduce power consumption of a UE receiving such an MBS service, a discontinuous reception (DRX) method that operates in accordance with the characteristics of the MBS service is required. The embodiment of FIG. 1*c* illustrates a method of such DRX operation for MBS. In the disclosure, DRX for MBS is abbreviated as MBS DRX.

DRX parameters for an MBS service are as follows.
drx-onDurationTimerMBS (on-duration timer)
drx-InactivityTimerMBS (DRX inactivity timer)
drx-CycleMBS (MBS DRX cycle, can be divided into short cycle and long cycle depending on the embodiment)
drx-SlotOffsetMBS (offset for MBS DRX)
drx-HARQ-RTT-TimerMBS (HARQ RTT timer)
drx-RetransmissionTimerMBS (DRX retransmission timer)

In MBS DRX, the UE may release the power saving operation to periodically monitor the physical downlink control channel (PDCCH) at regular intervals called MBS DRX cycle (drx-CycleMBS). To disperse the PDCCH monitoring time points of UEs, the base station may configure an offset for MBS DRX (drx-SlotOffsetMBS) to a UE. Then, the UE may start the on-duration timer at a point in time when the current system frame number (SFN) and subframe number satisfy the following equation.

$$[(SFN \times 10) + \text{subframe number}] \text{ modulo } (\text{drx-LongCycleMBS}) = \text{drx-SlotOffsetMBS}$$

In addition, when receiving the PDCCH allocated with the G-RNTI, the UE may start the DRX inactivity timer (or, restart it if it is already running). This DRX inactivity timer may be set up so that the UE can transition to power saving mode when MBS data is not received for a specific period of time. MBS DRX may be configured for each MAC entity of the UE or for each cell (or BWP) for which the G-RNTI is configured. In MBS, the base station may perform retransmission of a medium access control-protocol data unit (MAC PDU) according to hybrid automatic repeat request (HARQ) operation. However, such HARQ retransmission is performed for some UEs that have failed to receive a previously transmitted MAC PDU, and UEs that have already received the same packet do not need to receive HARQ retransmission. In order for the UE to receive a retransmission, the UE must be able to monitor the PDCCH and receive data at a time when retransmission is possible. To this end, the DRX retransmission timer may be started at a preset time point, and the UE may monitor the PDCCH for retransmission of the base station during this period. In an embodiment, the start time of the DRX retransmission timer may be immediately after the HARQ round trip time (RTT) timer expires. However, in another embodiment, the DRX retransmission timer may be started after a preset time from when receiving data with the G-RNTI.

The time during which the UE monitors the PDCCH allocated with the G-RNTI may be referred to as the active time of MBS DRX. The active time of MBS DRX may be defined as the running time of the on-duration timer of MBS DRX, DRX inactivity timer, or DRX retransmission timer.

The embodiment of FIG. 1c illustrates operations performed during the active time by the UE 1c-10 configured with MBS DRX described above. If there is the active time at the MAC entity of the UE configured with MBS DRX (1c-20), the UE may monitor the PDCCH allocated with the G-RNTI to check whether MBS data reception will occur (1c-30). Then, when receiving the PDCCH allocated with the G-RNTI, the DRX inactivity timer may be started. If the DRX inactivity timer is already running, the corresponding timer may be restarted. Further, data to be received in the HARQ process indicated by the PDCCH allocation of the G-RNTI may be received. This data corresponds to a MAC PDU or transport block (TB). If data to be received in this HARQ process is not successfully received, the UE may have to perform retransmission. To this end, the HARQ RTT timer may be started (1c-40). Here, the start point of the HARQ RTT timer may be set up by at least one of the following methods, which will be described later in FIGS. 1D, 1E and 1F.

Figure 1D:
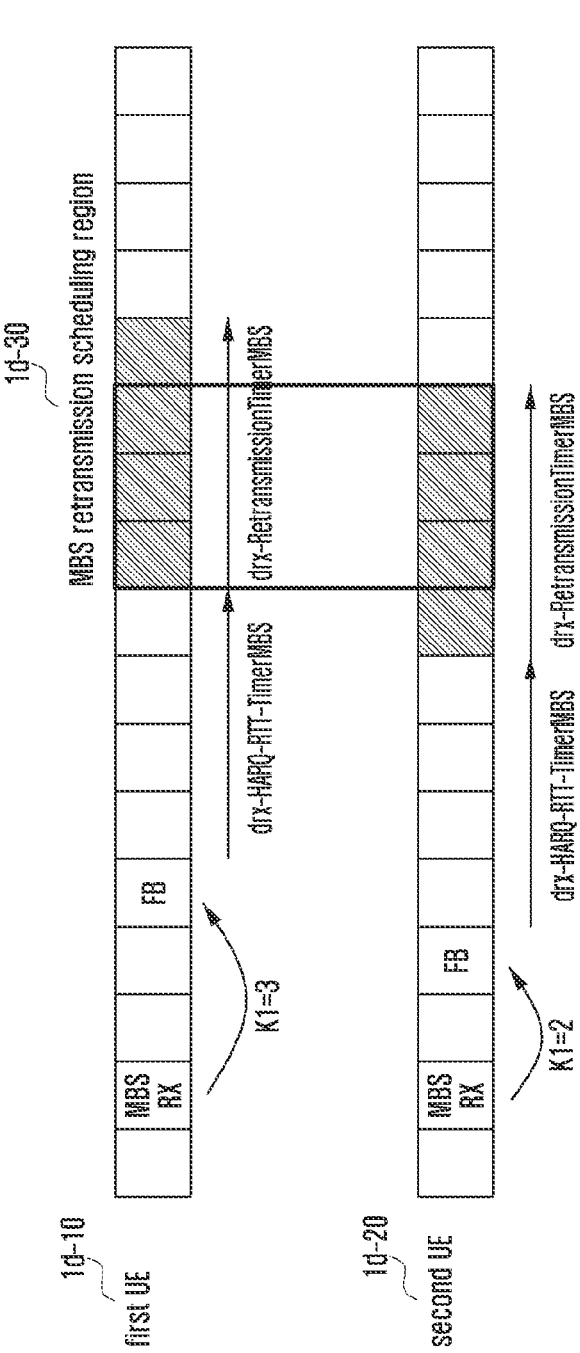
FIG. 1D is a diagram illustrating a scheme for plural UEs to perform DRX operation for MBS according to an embodiment of the disclosure.

Starting the HARQ RTT timer at the first symbol after transmitting HARQ feedback (embodiment of FIG. 1D)

Figure 1E:
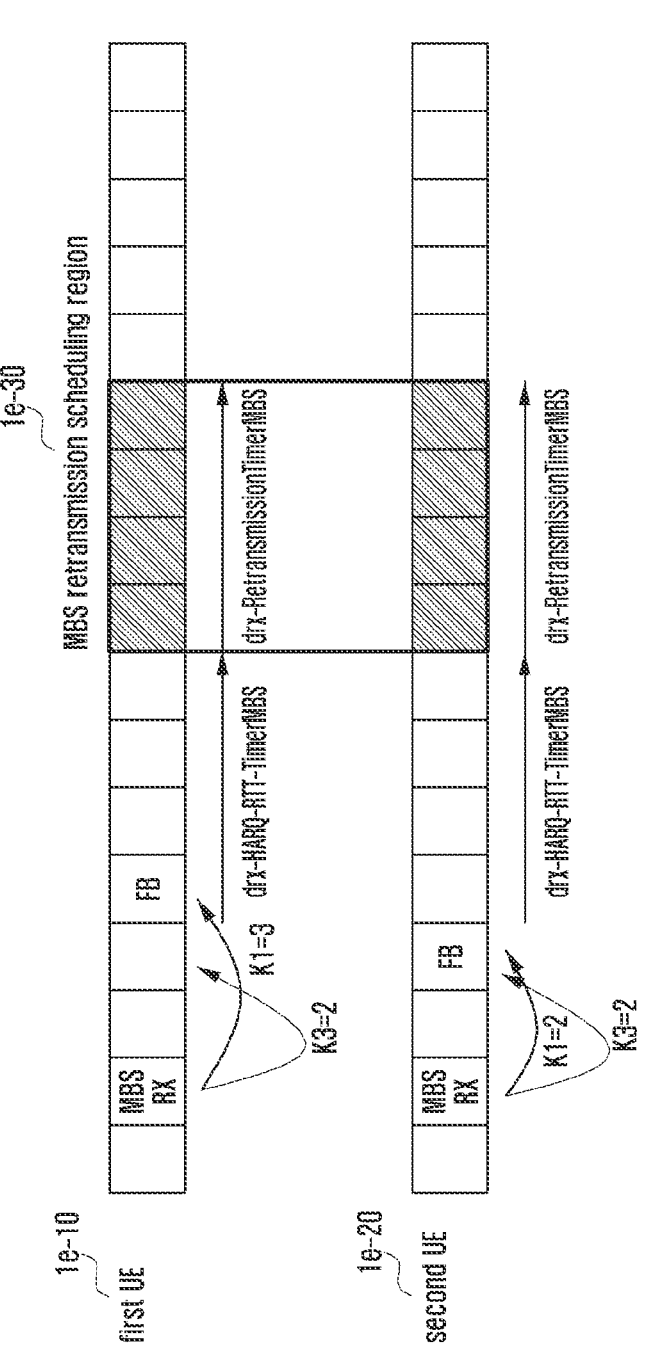
FIG. 1E is a diagram illustrating a scheme for plural UEs to perform DRX operation for MBS according to another embodiment of the disclosure.

Starting the HARQ RTT timer at a specific offset after the PDCCH allocated with the G-RNTI (embodiment of FIG. 1E)

Figure 1F:
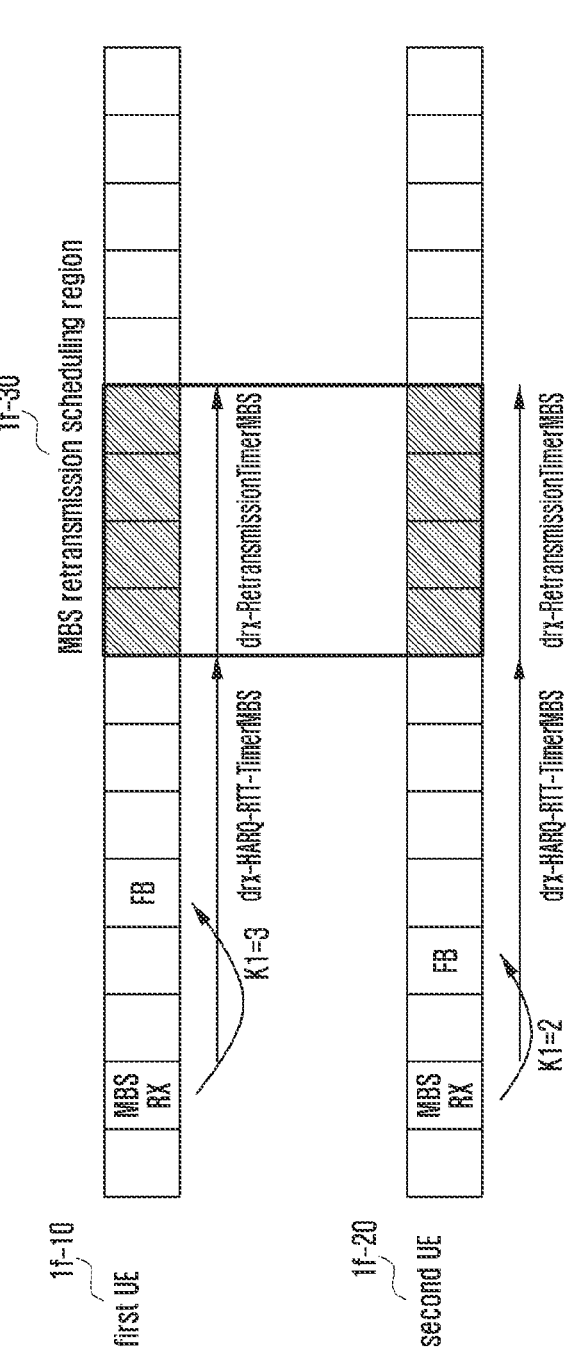
FIG. 1F is a diagram illustrating a scheme for plural UEs to perform DRX operation for MBS according to another embodiment of the disclosure.

Starting the HARQ RTT timer at the first symbol after the PDCCH allocated with the G-RNTI (embodiment of FIG. 1F)

Since the base station knows that retransmission will not be performed during the time in which the HARQ RTT timer of MBS DRX is running, this time may be not included in the active time of MBS DRX. Thereafter, when the HARQ RTT timer expires, the DRX retransmission timer for MBS DRX may be started at the first symbol (1c-50). During the DRX retransmission timer period, the UE may monitor the PDCCH to check whether there are a PDCCH allocated with the G-RNTI and a retransmission resource. The DRX retransmission timer for MBS DRX may be not started when the previous transmission through the corresponding process is successfully received. This may be for the purpose of preventing unnecessary retransmission of data that has already been successfully received.

FIG. 1D is a diagram illustrating a scheme for plural UEs to perform DRX operation for MBS according to an embodiment of the disclosure. Multicast and broadcast services (MBS) assume that a plurality of UEs receive an MBS service by using a common group-radio network temporary identifier (G-RNTI). However, the UEs may have different HARQ feedback resources (FB) for MBS data (MBS RX) received through downlink. Such a feedback resource is transmitted on the physical uplink control channel (PDCCH), and a constant K1 indicating the time from the received data to the feedback resource may be different for individual UEs. In the embodiment of FIG. 1D, it is assumed that the UE starts the HARQ RTT timer for MBS DRX at the first symbol immediately after transmitting the feedback. As shown in FIG. 1D, when different K1 values are set for two UEs, the UEs may transmit HARQ feedback at different time points and start the HARQ RTT timers at different time points. In this case, the DRX retransmission timers that will be started when the HARQ RTT timers expire may also be started at different time points; since the base station must perform retransmission of MBS data at the time when the DRX retransmission timers of the UEs requiring retransmission are commonly running, the MBS retransmission scheduling region 1d-30 becomes shorter than the length of the DRX retransmission timer. In the embodiment of FIG. 1D, the K1 values are set to 3 and 2 respectively for first UE 1d-10 and second UE 1d-20 receiving MBS data allocated with the same G-RNTI, and there is a difference of 1 in K1 value, which indicates that the MBS retransmission scheduling region is reduced. The reduction of the MBS retransmission scheduling region may cause inefficiency because the scheduling constraint of the base station increases and the UE, has unnecessary active time out of the MBS retransmission scheduling region.

To prevent this, the base station needs to set the same K1 value among UEs receiving MBS data by using the same G-RNTI resource. This identical K1 value may be referred to as common K1. Then, those UEs that receive MBS data using the same G-RNTI can run the DRX retransmission timers at the same time point, so that the MBS retransmission scheduling region can be equal to the length of the DRX retransmission timer. However, this scheme of setting a common K1 may be a restriction in scheduling of the base station because the base station must allocate HARQ feedback resources at the same time point.

FIG. 1E is a diagram illustrating a scheme for plural UEs to perform DRX operation for MBS according to another embodiment of the disclosure. Multicast and broadcast services (MBS) assume that a plurality of UEs receive an MBS service by using a common group-radio network temporary identifier (G-RNTI). However, the UEs may have different HARQ feedback resources (FB) for MBS data (MBS RX) received through downlink. Such a feedback resource is transmitted on the physical uplink control channel (PUCCH), and a constant K1 indicating the time from the received data to the feedback resource may be different for individual UEs.

In the embodiment of FIG. 1E, the K1 values are set to 3 and 2 respectively for first UE 1e-10 and second UE 1e-20 receiving MBS data allocated with the same G-RNTI, and there is a difference of 1 in K1 value, so that feedbacks about the MBS service are transmitted to the base station at different time points. However, in case of receiving the same MBS service, it is necessary to keep the MBS retransmission scheduling region 1e-30 equal to the length of the DRX retransmission timer by making the start times of the DRX retransmission timers coincide. The reduction of the MBS retransmission scheduling region may cause inefficiency because the scheduling constraint of the base station increases and the UE has unnecessary active time out of the MBS retransmission scheduling region. For this reason, it is possible to introduce a constant K3 indicating when the UE starts the HARQ RTT timer for MBS DRX. This K3 constant may be commonly set for the UEs that share the same G-RNTI to receive an MBS service. The UE may start the HARQ RTT timer at the first symbol after a time length corresponding to K3 from when receiving MBS data. The base station does not retransmit MBS data during the HARQ RTT timer relative to the K3 time, and when the HARQ RTT timer expires, it may start the DRX retransmission timer at the next symbol. While the DRX retransmission timer is running, the base station may perform MBS data retransmission to the UE. In the embodiment of FIG. 1E, even if the feedback resources for MBS data are located at different time points, the UEs start the DRX retransmission timers at the same time, so that the base station can secure an MBS retransmission scheduling region equal to the length of the DRX retransmission timer.

FIG. 1F is a diagram illustrating a scheme for plural UEs to perform DRX operation for MBS according to another embodiment of the disclosure. Multicast and broadcast services (MBS) assume that a plurality of UEs receive an MBS service by using a common group-radio network temporary identifier (G-RNTI). However, the UEs may have different HARQ feedback resources (FB) for MBS data (MBS RX) received through downlink. Such a feedback resource is transmitted on the physical uplink control channel (PUCCH), and a constant K1 indicating the time from the received data to the feedback resource may be different for individual UEs.

In the embodiment of FIG. 1F, the K1 values are set to 3 and 2 respectively for first UE 1*f*-10 and second UE 1*f*-20 receiving MBS data allocated with the same G-RNTI, and there is a difference of 1 in K1 value, so that feedbacks about the MBS service are transmitted to the base station at different time points. However, in case of receiving the same MBS service, it is necessary to keep the MBS retransmission scheduling region 1*f*-30 equal to the length of the DRX retransmission timer by making the start times of the DRX retransmission timers coincide. The reduction of the MBS retransmission scheduling region may cause inefficiency because the scheduling constraint of the base station increases and the UE has unnecessary active time out of the MBS retransmission scheduling region. For this reason, it is possible to determine the time point when the UE starts the HARQ RTT timer for MBS DRX, as the first symbol after receiving MBS data. However, in another embodiment, it may be determined as the first symbol after the PDCCH allocated with the G-RNTI. Due to this method, the UEs receiving the MBS service can start the HARQ RTT timers in the same way. The base station does not retransmit MBS data during the HARQ RTT timer, and when the HARQ RTT timer expires, it may start the DRX retransmission timer at the next symbol. While the DRX retransmission timer is running, the base station may perform MBS data retransmission to the UE. In the embodiment of FIG. 1F, even if the feedback resources for MBS data are located at different time points, the UEs start the DRX retransmission timers at the same time, so that the base station can secure an MBS retransmission scheduling region equal to the length of the DRX retransmission timer.

Figure 1G:
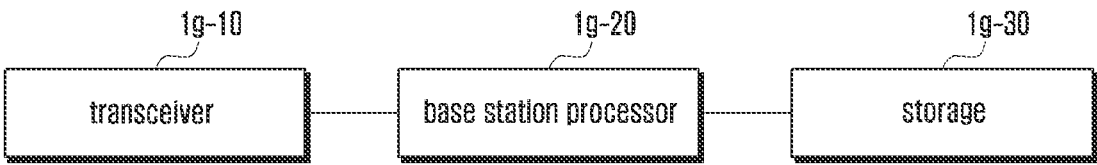
FIG. 1G is a diagram showing the structure of a base station according to an embodiment of the disclosure.

FIG. 1G is a diagram showing the structure of a base station according to various embodiments of the disclosure.

With reference to FIG. 1G, the base station may include a transceiver 1*g*-10, a processor 1*g*-20, and a memory 1*g*-30. In the disclosure, the processor 1*g*-20 may be a circuit or an application-specific integrated circuit, and may be at least one processor. Various embodiments of the disclosure are not limited to the example shown in FIG. 1G, and the base station may include more or fewer components than the configuration shown in FIG. 1G. Further, the transceiver 1*g*-10, the processor 1*g*-20 and the memory 1*g*-30 may be implemented in the form of a single chip.

The transceiver 1*g*-10 may transmit and receive signals to and from other network entities. For example, the transceiver 1*g*-10 may transmit system information to a UE and may transmit a synchronization signal or a reference signal. In addition, the signal transmitted and received to and from a UE or network entity may include control information and data. To this end, the transceiver 1*g*-10 may include an RF transmitter for up-converting and amplifying the frequency of a signal to be transmitted, and an RF receiver for low-noise amplifying a received signal and down-converting the frequency thereof. However, this is only an embodiment of the transceiver 1*g*-10, and components of the transceiver 1*g*-10 are not limited to the RF transmitter and the RF receiver. In addition, the transceiver 1*g*-10 may receive a signal through a radio channel and output it to the processor 1*g*-20, and may transmit a signal output from the processor 1*g*-20 through a radio channel.

The processor 1*g*-20 may control the overall operation of the base station according to various embodiments proposed in the disclosure. For example, the processor 1*g*-20 may control signal flows between blocks to perform. the operations of the base station described above with reference to FIGS. 1A to 1F.

The memory 1*g*-30 may store at least one of information transmitted and received through the transceiver 1*g*-10 or information generated through the processor 1*g*-20. The memory 1*g*-30 may store programs and data necessary for the operation of the base station. Also, the memory 1*g*-30 may store control information or data included in a signal obtained from a network entity. The memory 1*g*-30 may be composed of storage media such as ROM, RAM, hard disk, CD-ROM, and DVC, or a combination thereof. Also, the memory 1*g*-30 may be configured in plurality.

Figure 1H:
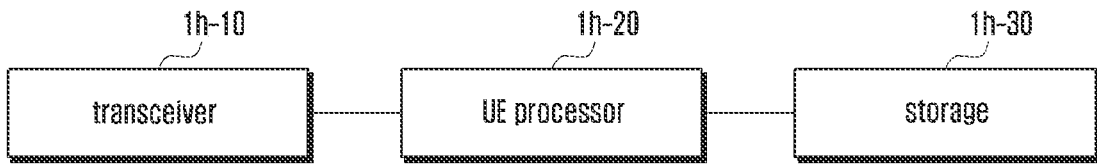
FIG. 1H is a diagram showing the structure of a UE according to an embodiment of the disclosure.

FIG. 1H is a diagram showing the structure of a UE according to various embodiments of the disclosure.

With reference to FIG. 1H, the UE may include a transceiver 1*h*-10, a processor 1*h*-20, and a memory 1*h*-30. In the disclosure, the processor 1*h*-20 may be a circuit or an application-specific integrated circuit, and may be at least one processor. Various embodiments of the disclosure are not limited to the example shown in FIG. 1H, and the UE may include more or fewer components than the configuration shown in FIG. 1H. Further, the transceiver 1*h*-10, the processor 1*h*-20, and the memory 1*h*-30 may be implemented in the form of a single chip.

The transceiver 1*h*-10 may transmit and receive signals to and from other network entities. For example, the transceiver 1*h*-10 may receive system information from the base station and may receive a synchronization signal or a reference signal. In addition, the signal transmitted and received to and from a base station or network entity may include control information and data. To this end, the transceiver 1*h*-10 may include an RF transmitter for up-converting and amplifying the frequency of a signal to be transmitted, and an RF receiver for low-noise amplifying a received signal and down-converting the frequency thereof. However, this is only an embodiment of the transceiver 1*h*-10, and components of the transceiver 1*h*-10 are not limited to the RF transmitter and the RF receiver. In addition, the transceiver 1*h*-10 may receive a signal through a radio channel and output it to the processor 1*h*-20, and may transmit a signal output from the processor 1*h*-20 through a radio channel.

The processor 1*h*-20 may control the overall operation of the UE according to various embodiments proposed in the disclosure. For example, the processor 1*h*-20 may control signal flows between blocks to perform the operations of the UE described above with reference to FIGS. 1A to 1F.

The memory 1*h*-30 may store at least one of information transmitted and received through the transceiver 1*h*-10 or information generated through the processor 1*h*-20. The memory 1*h*-30 may store programs and data necessary for the operation of the UE. Also, the memory 1*h*-30 may store control information or data included in a signal obtained in the UE. The memory 1*h*-30 may be composed of storage media such as ROM, RAM, hard disk, CD-ROM, and DVD, or a combination thereof. Also, the memory 1*h*-30 may be configured in plurality.

Figure 2A:
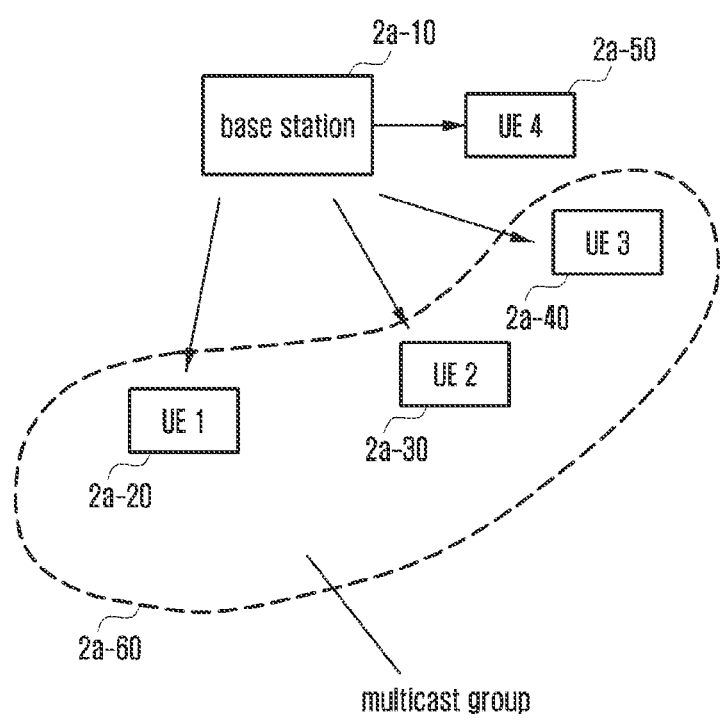
FIG. 2A is a diagram illustrating an operating scheme of MBS communication according to various embodiments of the disclosure.

FIG. 2A is a diagram illustrating an operating scheme of MBS communication according to various embodiments of the disclosure. Multicast and broadcast services (MBS) communication refers to a scheme in which one transmitting device communicates with one or more receiving devices in a wireless communication system. Here, the transmitting device may be a base station, and each receiving device may be a UE. However, without being limited thereto, the transmitting device may be a UE.

The embodiment of FIG. 2A illustrates an example of performing MBS communication when a base station 2*a*-10 is a transmitter and UEs 2*a*-20, 2*a*-30, 2*a*-40, 2*a*-50 are receivers. MBS communication may be performed in a broadcast scheme for many unspecified receivers, and may be performed in a multicast scheme for many specified receivers. If communication is performed in a multicast scheme, the base station may configure specific UEs to receive a corresponding multicast packet. To this end, a set of specific UEs to perform multicast communication may be defined, and this is referred to as a multicast group 2*a*-60 in the embodiment of FIG. 2A. On the other hand, a scheme of one-to-one communication between a base station and a UE is called unicast.

The UEs belonging to a multicast group may be assigned the same group-radio network temporary identity (G-RNTI), which is a resource identifier for each multicast group, to receive data allocated with the G-RNTI. Such a G-RNTI is an RNTI shared by UEs belonging to a multicast group, and those UEs that have received a G-RNTI can receive a radio resource for an MBS service from the base station. It is assumed in the embodiment of FIG. 2A that UE 1 (2*a*-20), UE 2 (2*a*-30), and UE 3 (2*a*-40) are configured as one multicast group and are assigned a G-RNTI to receive data from the base station 2*a*-10 in a multicast manner. As UE 4 (2*a*-50) is not included in the multicast group, it is not assigned the G-RNTI; hence, UE 4 (2*a*-50) cannot receive the data that UE 1 (2*a*-20), UE 2 (2*a*-30), and UE 3 (2*a*-40) receive from the base station.

One or more multicast groups may be defined within the coverage of the base station 2*a*-10, and one multicast group may be identified by a G-RNTI. One UE may be assigned one or more G-RNTIs from the base station 2*a*-10. The UE may receive multicast data by using a G-RNTI value assigned in connected mode (radio resource control (RRC) connected mode) not only in connected mode but also in idle mode (RRC idle mode) or inactive mode (RRC inactive mode). The G-RNTI may be included in at least one of an RRC reconfiguration message, an RRC setup message, or an RRC reestablishment message in connected mode of the UE. However, without being limited thereto, the G-RNTI may be transmitted from the base station by being included in a system information block (SIB) as a G-RNTI value that can be received by a UE. The UE having been configured with a G-RNTI value may apply the G-RNTI value thereafter.

Figure 2B:
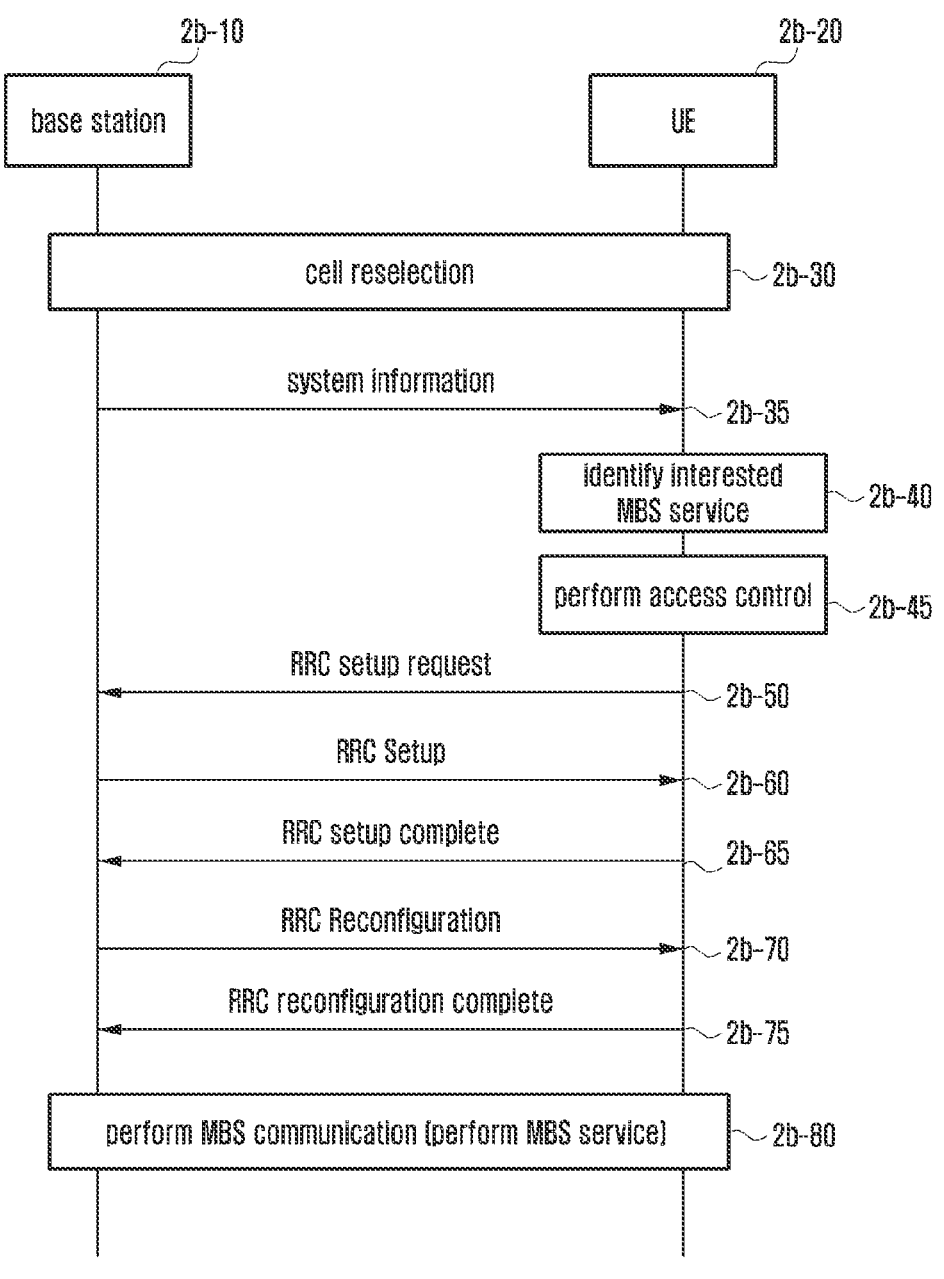
FIG. 2B is a diagram illustrating a configuration procedure for performing MBS communication according to various embodiments of the disclosure.

FIG. 2B is a diagram illustrating a configuration procedure for performing MBS communication according to various embodiments of the disclosure. The UE 2*b*-20, which is not in radio resource control (RRC) connected state with the base station 2*b*-10, may select a base station to request an MBS service for performing MBS communication. At step 2*b*-30, the UE 2*b*-20 may perform a cell selection or reselection procedure for receiving synchronization signals transmitted from base stations and selecting a base station with a strong received signal. In the embodiment of FIG. 2B, it is assumed that a UE that has transitioned to idle mode or inactive mode from initial connected state performs a cell reselection operation for selecting a cell.

At step 2*b*-35, the UE 2*b*-20 may receive a system information block (SIB) from the selected cell. Here, if the UE 2*b*-20 intends to receive an MBS service, it may receive a system information block including MBS information among system information blocks. The system information block including MBS information may include a list of MBS services that are being provided or can be provided by a serving cell.

Such a list of MBS services that are being provided or can be provided by the serving cell may be referred to as AvailableMBSList. AvailableMBSList may include pieces of MBS session information. The MBS session information may be composed of a temporary mobile group identity (TMGI) value for identifying a group, and an MBS session ID (sessionID). The TMGI value may include a public land mobile network (PLMN) ID (plmn-id) that identifies whether the service is provided by a network operator, and a service ID (serviceID) that identifies the service provided by the network operator. According to an embodiment of the disclosure, AvailableMBSList may have the following structure.

AvailableMBSList=MBSSessionInfoList
MBSSessionInfoList=Sequence of (tmgi, sessionID)
tmgi=(plmn-id, serviceID)

If all UEs request an RRC configuration to receive MBS services, the base station may instantaneously have to establish connections to many UEs, which may cause overload on the base station. Hence, an access control scheme for MBS services may be required. To this end, for each TMGI, an access category value and uac-BarringForAccessIdentity may be set for access control. The base station can utilize the access category and uac-BarringForAccessIdentity set for each TMGI to control the frequency at which a UE requests access to the base station for each TMGI. In the embodiment of FIG. 2B, it is assumed that the UE 2*b*-20 receives a system information block including MBS information, but various embodiments of the disclosure are not limited to the embodiment of FIG. 2B, and MBS information may be transmitted by a DL Information Transfer message.

Upon receiving the system information block including MBS information at step 2*b*-35, at step 2*b*-40, the UE 2*b*-20 may identify an MBS service of interest from the list of MBS services that are being provided or can be provided by the serving cell. The UE 2*b*-20 may determine which MBS service the UE 2*b*-20 is interested in based on whether the MBS service is required by an application of the UE 2*b*-20 or other conditions. The criterion by which the UE 2*b*-20 identifies an MBS service may be a TMGI unit. In other words, the UE 2*b*-20 may check whether the TMGI of the MBS service that the UE 2*b*-20 intends to receive (or that the UE 2*b*-20 is interested in) is included in the system information block including MBS information. Specifically, the UE 2*b*-20 may check whether the TMGI of the MBS service that the UE 2*b*-20 intends to receive is included in the AvailableMBSList of the system information block including the MBS information. If the TMGI of the MBS service that the UE 2b-20 intends to receive is included in the system information block including the MBS information, the UE 2b-20 may perform a step of establishing an RRC connection to receive the corresponding MBS service.

At step 2b-45, the UE 2b-20 may perform an access control operation to determine whether to initiate RRC connection establishment. The UE 2b-20 may perform access control based on the PLMN ID (plmn-ID) included in the TMGI of the MBS service to be received by using UAC-barring information for the corresponding PLMN ID. The UE 2b-20 may determine whether access is allowed for the uac-BarringForAccessIdentity and access category of the MBS service that the UE 2b-20 intends to receive. If access to this MBS service is allowed, the UE 2b-20 may initiate a procedure for requesting an RRC connection.

If access for receiving the MBS service is allowed for the UE 2b-20, at step 2b-50, the UE 2b-20 may transmit an RRC setup request message to the base station 2b-10. However, the disclosure is not limited by the UE 2b-20 transmitting the RRC setup request message, and an RRC reestablishment request message may also be used for the same purpose as the RRC setup request message. Since the RRC setup request message or the RRC reestablishment request message is a general message that can be used for the UE 2b-20 to transition to connected mode (RRC connected mode), it may include a cause value as to what purpose the UE 2b-20 intends to transition to connected mode. If the UE 2b-20 intends to receive the MBS service, it may transmit, to the base station 2b-10, an RRC setup request or RRC reestablishment request message including a cause value indicating that it intends to set up MBS. However, if the RRC setup request or RRC reestablishment request is not for the UE 2b-20 to receive the MBS service, the UE 2b-20 may transmit an RRC setup or RRC reestablishment request message including a cause value transferred from the upper layer. For example, the cause value transferred from the upper layer may include information related to the non-access stratum (NAS) layer. At step 2b-60, the base station 2b-10 may transmit an RRC setup message to the UE 2b-20 to allow the UE 2b-20 to transition to connected mode. However, the disclosure is not limited by the base station 2b-10 transmitting the RRC setup message, and an RRC reestablishment message may also be used for the same purpose as the RRC setup message. When the UE 2b-20 receives the RRC setup message or RRC reestablishment message, SRB1 may be configured according to the configuration information of signaling radio bearer 1 (SRB1) included in the received message. SRB1 may be a radio bearer for exchanging radio resource control (RRC) messages between the base station 2b-10 and the UE 2b-20.

At step 2b-65, the UE 2b-20 may apply configuration information included in the RRC setup message or RRC reestablishment message, and may transmit an RRC setup complete message or RRC reestablishment complete message to the base station 2b-10 to notify the base station 2b-10 that the configuration received from the base station 2b-10 has been successfully applied. In addition, the RRC setup complete message or RRC reestablishment complete message transmitted at step 2b-65 may include a list of MBS services that the UE 2b-20 intends to receive. The MBS service list included in the RRC setup complete message or RRC reestablishment complete message may be a list including TMGI values corresponding to the MBS services that the UE 2b-20 intends to receive. Here, the TMGI included in the MBS service list may be all or some of TMGIs included in the list of MBS services that are being provided or can be provided by the serving cell included in the system information block or downlink information transfer message transmitted at step 2b-35 by the base station 1b-10.

At step 2b-70, the base station 2b-10 may transmit an RRC reconfiguration message to the UE 2b-20. As SRB1 is configured and the list of MBS services that the UE 2b-20 intends to receive is transmitted to the base station 2b-10 at step 2b-65, the base station 2b-10 may configure the UE 2b-20 to receive the MBS service based on configured SRB1 and the MBS service list. The MBS service set by the base station 2b-10 for the UE 2b-20 to receive may be configured by using the RRC reconfiguration message transmitted from the base station 2b-10 to the UE 2b-20. The RRC reconfiguration message may include configuration information for signaling radio bearer 2 (SRB2) used to exchange non-access stratum (NAS) messages, data radio bearer (DRB) used for data transmission and reception, and point-to-multipoint (PTM) DRB used for multicast transmission. The PTM DRB may be configured without distinction from the normal DRB, and may also be configured with a received G-RNTI. In addition, based on the RRC reconfiguration message, a radio link control (RLC) bearer through which the established radio bearer will be transmitted may be configured, and the radio bearer to which this RLC bearer is to be connected may be configured. In the RRC reconfiguration message, a G-RNTI with which UEs belonging to a multicast group can receive multicast data may be set.

The G-RNTI is an RNTI set for reception of a transport block (TB) and may be used to indicate scheduling information for the physical downlink shared channel (PDSCH). This G-RNTI may be set per MAC layer entity, but may also be set up per bandwidth part (BWP). If a G-RNTI is set per BWP, the set G-RNTI can be used only when receiving a PDSCH resource of the corresponding BWP. That is, this G-RNTI may be not used in other BWPs. To this end, the G-RNTI may be included in the downlink BWP configuration (BWP-Downlink) field of an RRC message (e.g., at least one of RRC reconfiguration message, RRC setup message, or RRC reestablishment message). In addition, a BWP ID to be used to set the G-RNTI may also be set. In another embodiment, the G-RNTI may be set up per cell. If a G-RNTI is set per cell, the set G-RNTI can be used only when receiving a PDSCH resource of the corresponding cell. That is, this G-RNTI may be not used in other cells. To this end, the G-RNTI may be included in the cell configuration field of an RRC message. In addition, a cell ID to be used to set the G-RNTI may also be set up.

For reception of an MBS service, a BWP and a search space may be configured separately. Information on the BWP and search space for receiving a specific MBS service may be configured in the UE 2b-20 by the base station 2b-10, and an MBS BWP and MBS search space may be included in this configuration information. The MBS BWP may refer to a BWP to which the assigned G-RNTI is applied. According to an embodiment, the BWP including a G-RNTI in the BWP-Downlink field may be an MBS BWP. The MBS search space may be a search space whose configuration information includes a downlink control information (DCI) format for MBS reception, or a search space whose configuration information includes an indicator indicating that the search space is for MBS reception. For example, search space configuration information may include a 1-bit indicator indicating whether the corresponding search space is an MBS search space. If the indicator of search space configuration information indicates an MBS search space, the corresponding search space may be an MBS search space and may be used as a search space for monitoring a G-RNTI for MBS reception.

When the UE has applied the content included in the RRC reconfiguration message transmitted at step 2b-70 from the base station 2b-10 to the UE 2b-20, at step 2b-75, the UE 2b-20 may transmit an RRC reconfiguration complete message to the base station 2b-10 to notify the base station 2b-10 that the information of the RRC reconfiguration message has been applied. Based on the RRC reconfiguration complete message, at step 2b-80, the UE 2b-20 may receive a broadcast or multicast packet by performing MBS communication. The UE 220 may receive the MBS service from the base station.

Figure 2C:
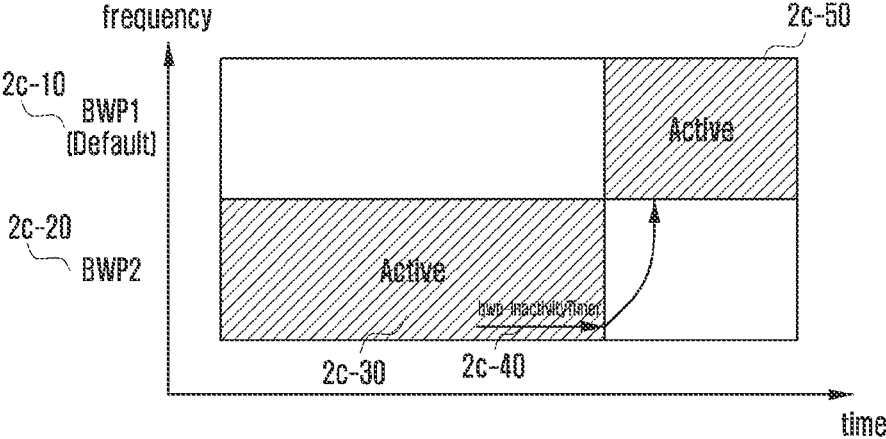
FIG. 2C is a diagram illustrating bandwidth part (BWP) switching operation according to various embodiments of the disclosure.

FIG. 2C is a diagram illustrating BWP switching operation according to various embodiments of the disclosure. According to the characteristics of a mobile communication network supporting high-speed transmission, frequency resources used for wireless communication between the base station and the UE mainly have a wide bandwidth. However, the entire bandwidth does not necessarily have to be used by one UE, and when there are many UEs connected to the base station, it may be effective for multiple UEs to use frequency resources in a shared manner. Further, it is not effective for one UE to use the entire bandwidth because this may increase power consumption of the UE. To solve these problems in a mobile communication network, the frequency band used in a cell is divided into several bandwidth parts (BWPs), and a scheme has been introduced in which the UE has only one active BWP at a time and performs transmission and reception only on the active BWP. In the embodiment of FIG. 2C, two BWPs including first BWP 2c-10 and second BWP 2c-20 are defined. However, defining two BWPs is illustrative only, and one or more BWPs may be defined. For example, four BWPs may be defined. As described above, one UE has one active BWP; but when data transmission and reception does not occur on the active BWP, the active BWP currently assumed by the UE may be not the active BWP actually configured by the base station for the UE. In this case, it is necessary to retry transmission and reception with the base station on the BWP used for a kind of initial transmission and reception. The BWP used for such initial transmission and reception is called the default BWP. The MAC entity of the UE may start or restart the BWP inactivity timer (bwp-InactivityTimer) 2c-40 to indicate that the current BWP is being used in active state whenever a PDCCH indicating uplink or downlink resources allocated with C-RNTI (cell-radio network temporary identifier) or CS-RNTI (configured scheduling-radio network temporary identifier) is received, a MAC PDU is transmitted using uplink configured grant resources, or a MAC PDU is received using downlink semi-persistent scheduling (SPS) resources. Thereafter, when the BWP inactivity timer expires, the active BWP may be switched to the default BWP. In the embodiment of FIG. 2C, the second BWP 2c-20 is the active BWP at the start of the embodiment (2c-30), and after the BWP inactivity timer expires (2c-40), the active BWP is switched to the first BWP 2c-10 being the default BWP (2c-50).

BWP switching may be triggered by BWP switching indication information transmitted on the physical downlink control channel (PDCCH). If the UE is receiving an MBS service and has been assigned a group-radio network temporary identifier (G-RNTI) therefor, BWP switching for the MBS service may be indicated by a PDCCH resource allocated with the G-RNTI. In this case, only switching of the active BWP receiving the MBS service can be indicated by a PDCCH resource allocated with the G-RNTI. As the G-RNTI is an RNTI shared by multiple UEs, when switching of the active BWP is indicated by a PDCCH resource allocated with the G-RNTI, all UEs having been assigned the corresponding G-RNTI may switch the active BWP to the indicated BWP. When an MBS service is received on a specific BWP, if the BWP is switched to the default BWP after the BWP inactivity timer owing to an inactive period of MBS data or the other, this may mean that the UE can no longer receive the MBS service having been received on the previous active BWP. Therefore, if the UE receives an MBS service, active BWP switching may have to be performed depending on whether the MBS service is received. Embodiments to be described later show various examples of performing active BWP switching depending on the MBS service.

Figure 2D:
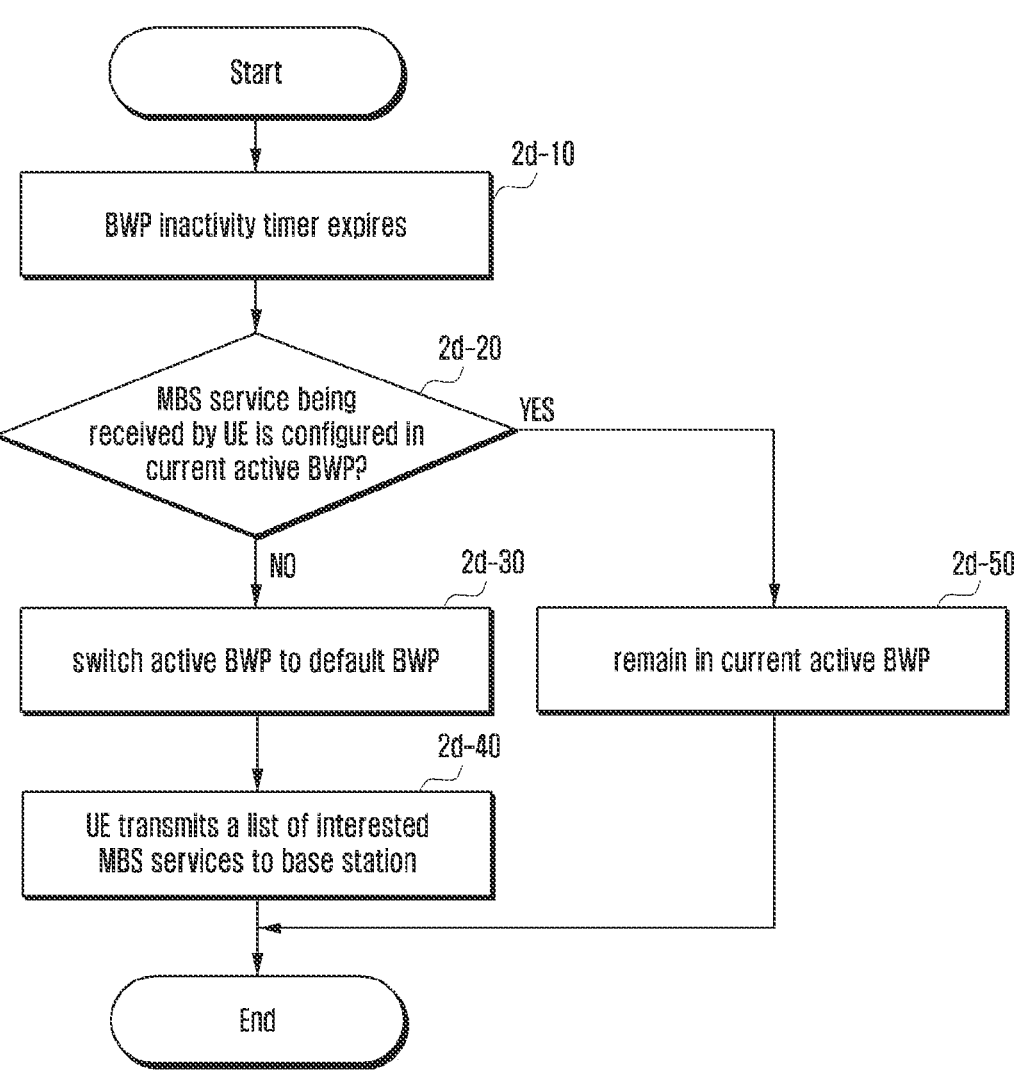
FIG. 2D is a diagram illustrating BWP switching operation in consideration of MBS operation according to an embodiment of the disclosure.

FIG. 2D is a diagram illustrating BWP switching operation in consideration of MBS operation according to an embodiment of the disclosure. Since multicast and broadcast services (MBS) transmit the same data to multiple UEs by using a single resource, a bandwidth part (BWP) on which a specific MBS service is to be provided is designated, and the MBS service can be provided only on one or more designated BWPs. In this case, if a UE receives an MBS service and the MBS service is provided on the active BWP of the UE, the UE may remain in that BWP until it no longer receives the MBS service.

When the BWP inactivity timer expires (2d-10), the MAC entity of the UE may check whether an MBS service being received by the UE is configured in the current active BWP (2d-20). In another embodiment, the MBS service being received by the UE may be replaced with the MBS service in which the UE is interested. If an MBS service being received by the UE is not configured in the current active BWP when the BWP inactivity timer expires, the UE may switch the active BWP to the default BWP (2d-30). Thereafter, if there is an additional MBS service of interest to the UE, the UE may transmit a list of interested MBS services to the base station (2d-40) to be configured with the corresponding MBS service.

If an MBS service being received by the UE is configured in the current active BWP when the BWP inactivity timer expires, the UE maintains the current active BWP despite expiration of the BWP inactivity timer and does not switch the active BWP to the default BWP (2d-50). The embodiment of FIG. 2D can be applied only when the MBS service received by the UE has a higher priority than unicast transmission of the UE.

Figure 2E:
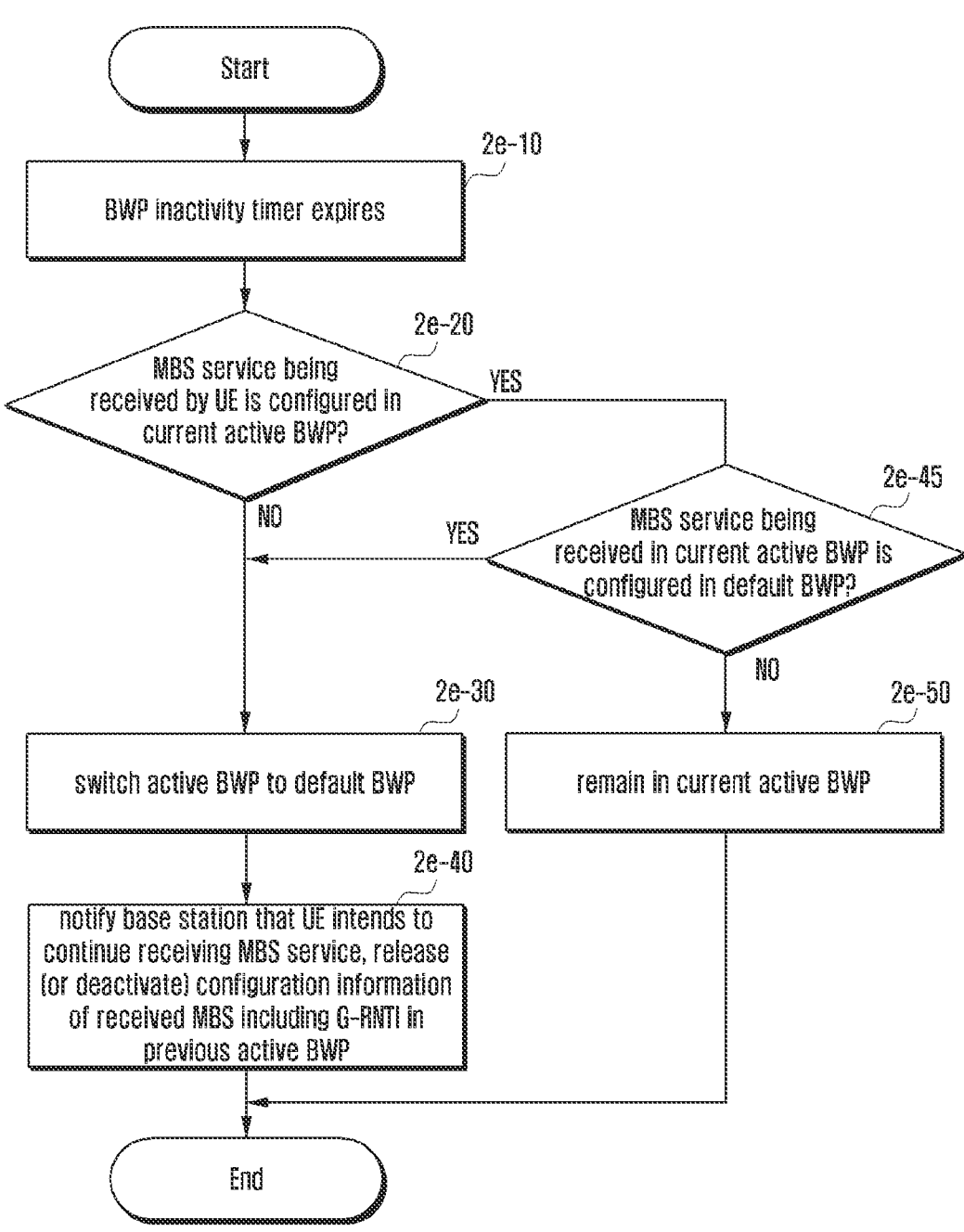
FIG. 2E is a diagram illustrating BWP switching operation in consideration of MBS operation according to another embodiment of the disclosure.

FIG. 2E is a diagram illustrating BWP switching operation in consideration of MBS operation according to another embodiment of the disclosure. Since multicast and broadcast services (MBS) transmit the same data to multiple UEs by using a single resource, a bandwidth part (BWP) on which a specific MBS service is to be provided is designated, and the MBS service can be provided only on one or more designated BWPs. In this case, if a UE receives an MBS service and the MBS service is provided on the active BWP of the UE, the UE may remain in that BWP until it no longer receives the MBS service. Otherwise, if the UE can continue to receive the MBS service even if it switches to another BWP, it may continue to receive the MBS service after active BWP switching.

When the BWP inactivity timer expires (2e-10), the MAC entity of the UE may check whether an MBS service being received by the UE is configured in the current active BWP (2e-20). In another embodiment, the MBS service being received by the UE may be replaced with the MBS service in which the UE is interested. If the MBS service being received by the UE is not configured in the current active BWP when the BWP inactivity timer expires, the UE may switch the active BWP to the default BWP (2e-30). Then, if there is an MBS service that the UE is interested in and intends to receive, the UE may transmit a list of MBS services that the UE is interested in and intends to receive to the base station. When switching the active BWP to the default BWP, if there is a G-RNTI or MBS configuration information set in the previous active BWP, the UE may release this information (2e-40).

Although the MBS service being received by the UE is configured in the current active BWP when the BWP inactivity timer expires (2e-20), if the MBS service received in the current active BWP is configured in the default BWP and the UE can receive the MBS service on the default BWP (2e-45), the UE may switch the active BWP to the default BWP (2e-30). Then, a list of MBS services that the UE is interested in and intends to receive and MBS services that the UE intends to continuously receive may be transmitted to the base station. When switching the active BWP to the default BWP, if there is a G-RNTI or MBS configuration information set in the previous active BWP, the UE may release this information (2e-40).

Although the MBS service being received by the UE is configured in the current active BWP when the BWP inactivity timer expires (2e-20), if the MBS service received in the current active BWP is not configured in the default BWP and the UE is unable to receive the MBS service on the default BWP (2e-45), the UE maintains the current active BWP despite expiration of the BWP inactivity timer and does not switch the active BWP to the default BWP (2e-50). For example, the embodiment of FIG. 2E can be applied only when the MBS service received by the UE has a higher priority than unicast transmission of the UE.

Figure 2F:
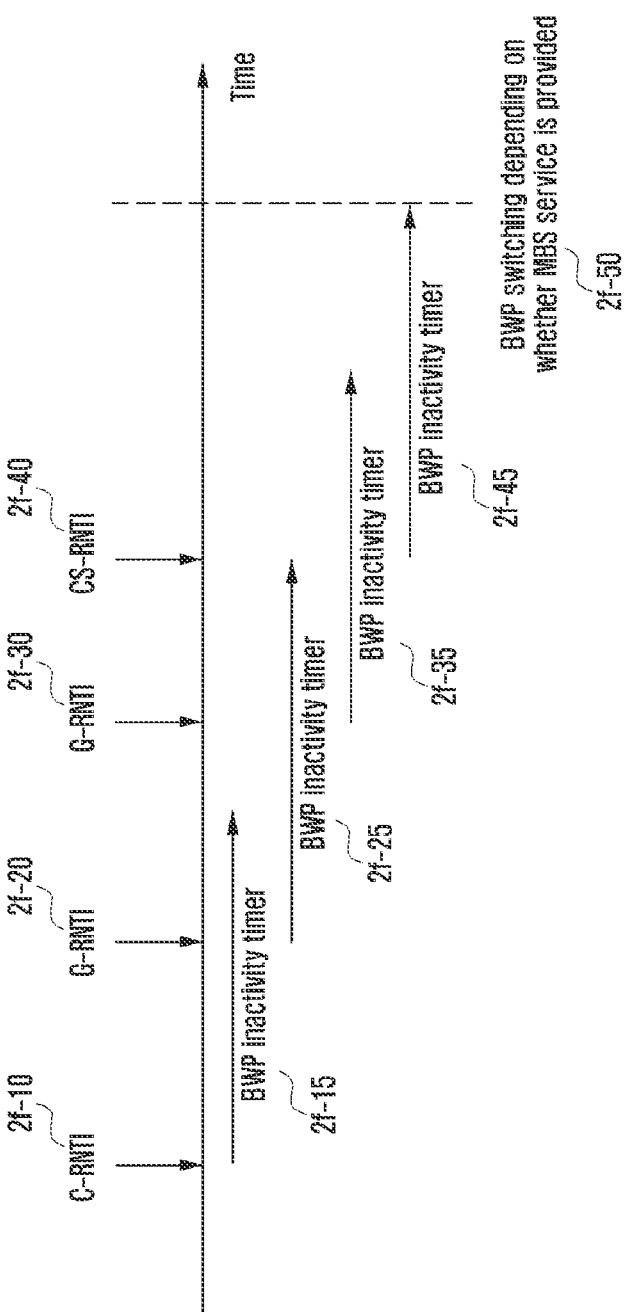
FIG. 2F illustrates an operation. process of the BWP inactivity timer according to an embodiment of the disclosure.

FIG. 2F illustrates an operation process of the BWP inactivity timer according to an embodiment of the disclosure. In case that the UE is receiving an MBS service on the active bandwidth part (BWP), switching the active BWP to the default BWP due to expiration of the BWP inactivity timer cannot guarantee that the MBS service currently provided will be provided on the default BWP, which may be equivalent to not being able to guarantee the continuity of the MBS service. Therefore, when the MBS service is received while the BAT inactivity timer is running, an operation to restart the BWP inactivity timer may be required. In other words, the MAC entity allocated a G-RNTI for an MBS service can start or restart the BWP inactivity timer (2f-15, 2f-25, 2f-35, 2f-45) when at least one of the following conditions is satisfied.

The medium access control (MAC) entity of the UE receives a physical downlink control channel (PDCCH) indicating an uplink or downlink resource allocated with a cell-radio network temporary identifier (C-RNTI) or a configured scheduling-radio network temporary identifier (CS-RNTI)

The MAC entity of the UE transmits a MAC PDU by using an uplink configured grant resource The MAC entity of the UE receives a MAC PDU by using a downlink semi-persistent scheduling (SPS) resource The MAC entity of the UE receives a PDCCH indicating a downlink resource allocated with a group-radio network temporary identifier (G-RNTI)

The MAC entity of the UE receives a PDCCH indicating an uplink resource allocated with a G-RNTI (only when an uplink logical channel corresponding to the MBS radio bearer is allocated)

In the embodiment of FIG. 2F, the fact that the BWP inactivity timer is running may indicate that the active BWP is currently being used in active state. Later, when the BWP inactivity timer expires, the active BWP may be switched to the default BWP.

In the embodiment of FIG. 2F, when detecting a PDCCH resource allocated with a C-RNTI (2f-10), the UE may start the BWP inactivity timer (2f-15). Thereafter, when a PDCCH resource allocated with a G-RNTI is detected (2f-20), the running BWP inactivity timer (2f-15) may be stopped and the BWP inactivity timer may be restarted (2f-25). Thereafter, when a PDCCH resource allocated with the G-RNTI is detected again (2f-30), the running BWP inactivity timer (2f-25) may be stopped and the BWP inactivity timer may be restarted (2f-35). Thereafter, when a PDCCH resource allocated with a CS-RNTI is detected (2f-40), the running BWP inactivity timer (2f-35) may be stopped and the BWP inactivity timer may be restarted (2f-45). In this way, restarting the BWP inactivity timer may indicate that the current active BWP is used. Later, when the BWP inactivity timer expires, as described above with reference to FIGS. 2D and 2E, BWP switching may be performed depending on whether the MBS service is provided (2f-50). However, according to another embodiment, the active BWP may be switched to the default BWP immediately upon expiration of the BWP inactivity timer depicted in FIG. 2F.

Figure 2G:
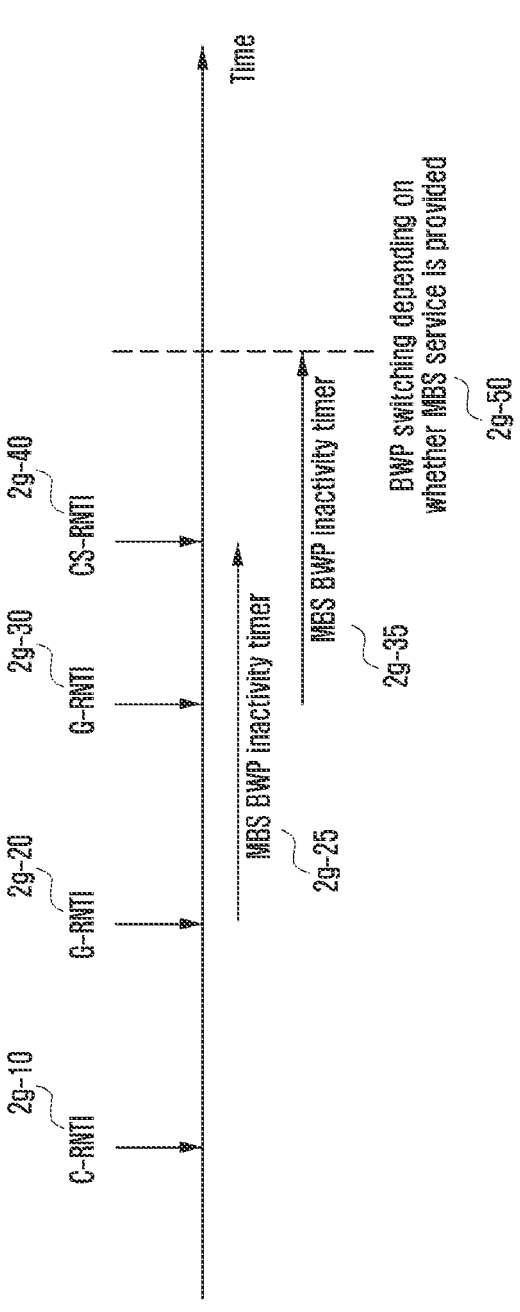
FIG. 2G illustrates an operation process of the BWP inactivity timer according to another embodiment of the disclosure.

FIG. 2G illustrates an operation process of the BWP inactivity timer according to another embodiment of the disclosure. In case that the UE is receiving an MBS service on the active bandwidth part (BWP), switching the active BWP to the default BWP due to expiration of the BWP inactivity timer cannot guarantee that the MBS service currently provided will be provided on the default BWP, which may be equivalent to not being able to guarantee the continuity of the MBS service. Therefore, it may be necessary to define an MBS BWP inactivity timer and restart the MBS BWP inactivity timer When an MBS service is received. This MBS BWP inactivity timer may be defined as a separate timer different from the existing BWP inactivity timer used for unicast.

The MAC entity assigned with a G-RNTI for an MBS service may start or restart the MBS BWP inactivity timer when at least one of the following conditions is satisfied.

The medium access control (MAC) entity of the UE receives a physical downlink control channel (PDCCH) indicating a downlink resource allocated with a group-radio network temporary identifier (G-RNTI)

The MAC entity of the UE receives a PDCCH indicating an uplink resource allocated with a G-RNTI (only when an uplink logical channel corresponding to the MBS radio bearer is allocated)

In the embodiment of FIG. 2G, the fact that the MBS BWP inactivity timer is running may indicate that the active BWP is currently being used in active state. Later, when the MBS BWP inactivity timer expires, the active BWP may be switched to the default BWP in consideration of the operation of the BWP inactivity timer for unicast. If the current active BWP of the UE is configured as an MBS-only BWP and unicast data is not transmitted/received, it may be switched to the default BWP when the MBS BWP inactivity timer expires.

In the embodiment of FIG. 2G, when detecting a PDCCH resource allocated with a cell-radio network temporary identifier (C-RNTI) (2g-10), the UE does not start the MBS BWP inactivity timer. Later, when a PDCCH resource allocated with a G-RNTI is detected (2g-20), the MBS BWP inactivity timer may be started (2g-25). Thereafter, when a PDCCH resource allocated with the G-RNTI is detected again (2g-30), the running MBS BWP inactivity timer (2g-25) may be stopped and the MBS BWP inactivity timer may be restarted (2g-35). Thereafter, when a PDCCH resource allocated with a CS-RNTI is detected (2g-40), the running MBS BWP inactivity timer (2g-35) is not stopped. In this way, restarting the MBS BWP inactivity timer may indicate that the current active BWP is used. Thereafter, when the BWP inactivity timer expires, as will be described later in FIG. 2H or 2I, the active BWP can be switched to the default BWP if the BWP inactivity timer for unicast also expires. However, according to another embodiment, in active BWP switching, the active BWP may be switched to the default BWP only when the MBS service currently being provided can be continuously provided on the default BWP (2g-50). Further, in another embodiment, the active BWP may be switched to the default BWP immediately upon expiration of the MBS BWP inactivity timer depicted in FIG. 2G.

FIG. 2H illustrates an operation. process when an MBS BWP inactivity timer and a unicast BWP inactivity timer coexist according to an embodiment of the disclosure. As described in FIG. 2G, when receiving a physical downlink control channel (PDCCH) allocated with a group-radio network temporary identifier (G-RNTI) for multicast and broadcast services (MBS), the UE may start the MBS bandwidth part (BWP) inactivity timer. If the UE is not only using an MBS service on the current active BWP but also performing unicast transmission and reception, the BWP inactivity timer defined for unicast can also operate together. When the unicast BWP inactivity timer expires in the medium access control (MAC) entity (2h-10), whether to switch the active BWP to the default BWP may depend on whether the MBS BWP inactivity timer has expired (2h-20). If the MBS BWP inactivity timer has also expired, as it means that data can no longer be transmitted or received on the current active BWP, the UE may switch the active BWP to the default BWP (2h-30). Then, the UE may transmit a list of MBS services of interest to the base station to inform the base station that it intends to continue receiving the MBS service. In addition, it is possible to release (or deactivate) configuration information of MBS being received including the G-RNTI configured in the previous active BWP (2h-40). Otherwise, if the unicast BWP inactivity timer has expired but the MBS BWP inactivity timer has not expired (2h-20), the UE may remain in the current active BWP (2h-50). Since this may mean that the MBS service is still in progress, the UE does not switch the active BWP to the default BWP.

Figure 2I:
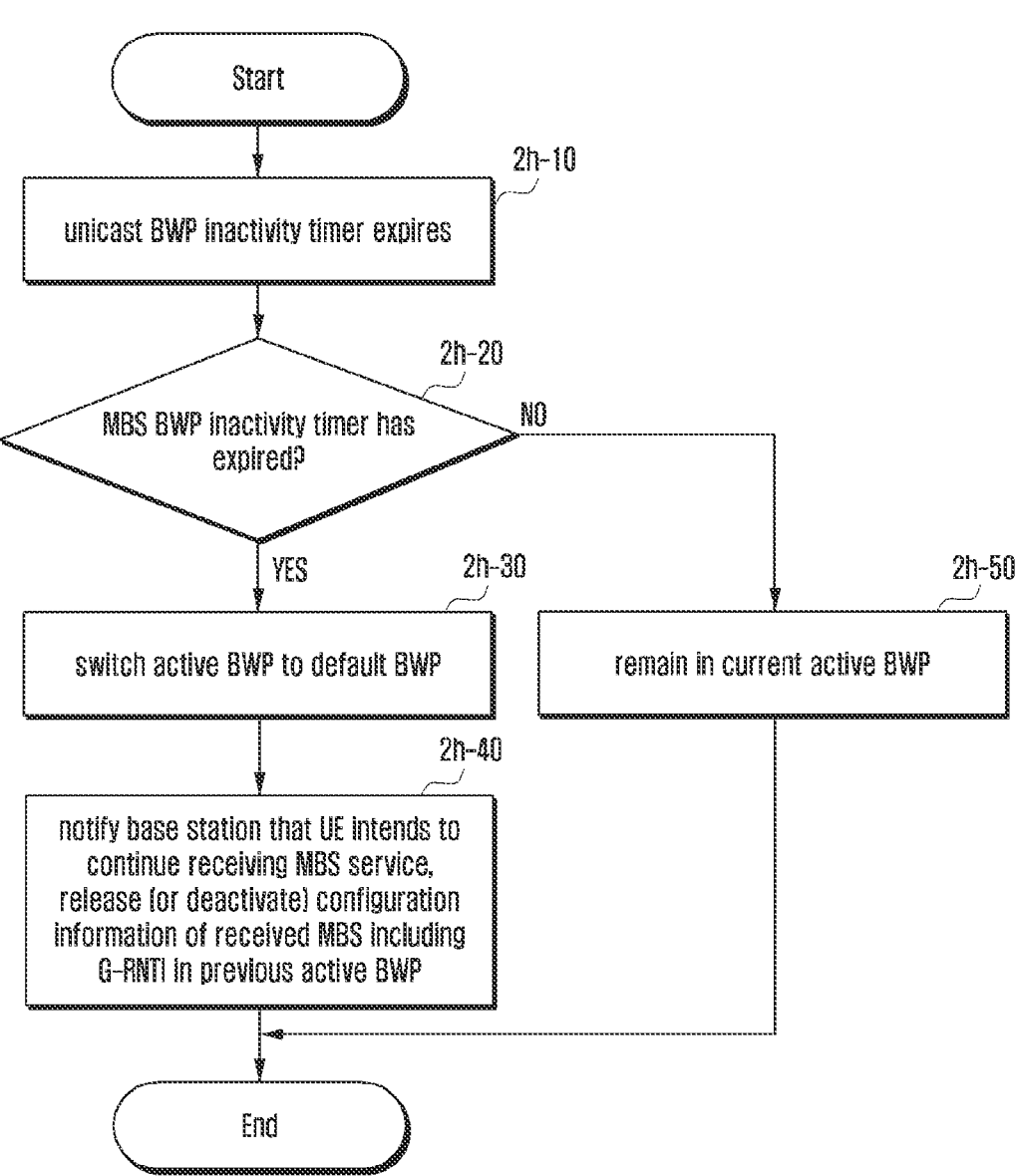
FIG. 2I illustrates an operation process when an MBS BWP inactivity timer and a unicast BWP inactivity timer coexist according to another embodiment of the disclosure.
Figure 2I:
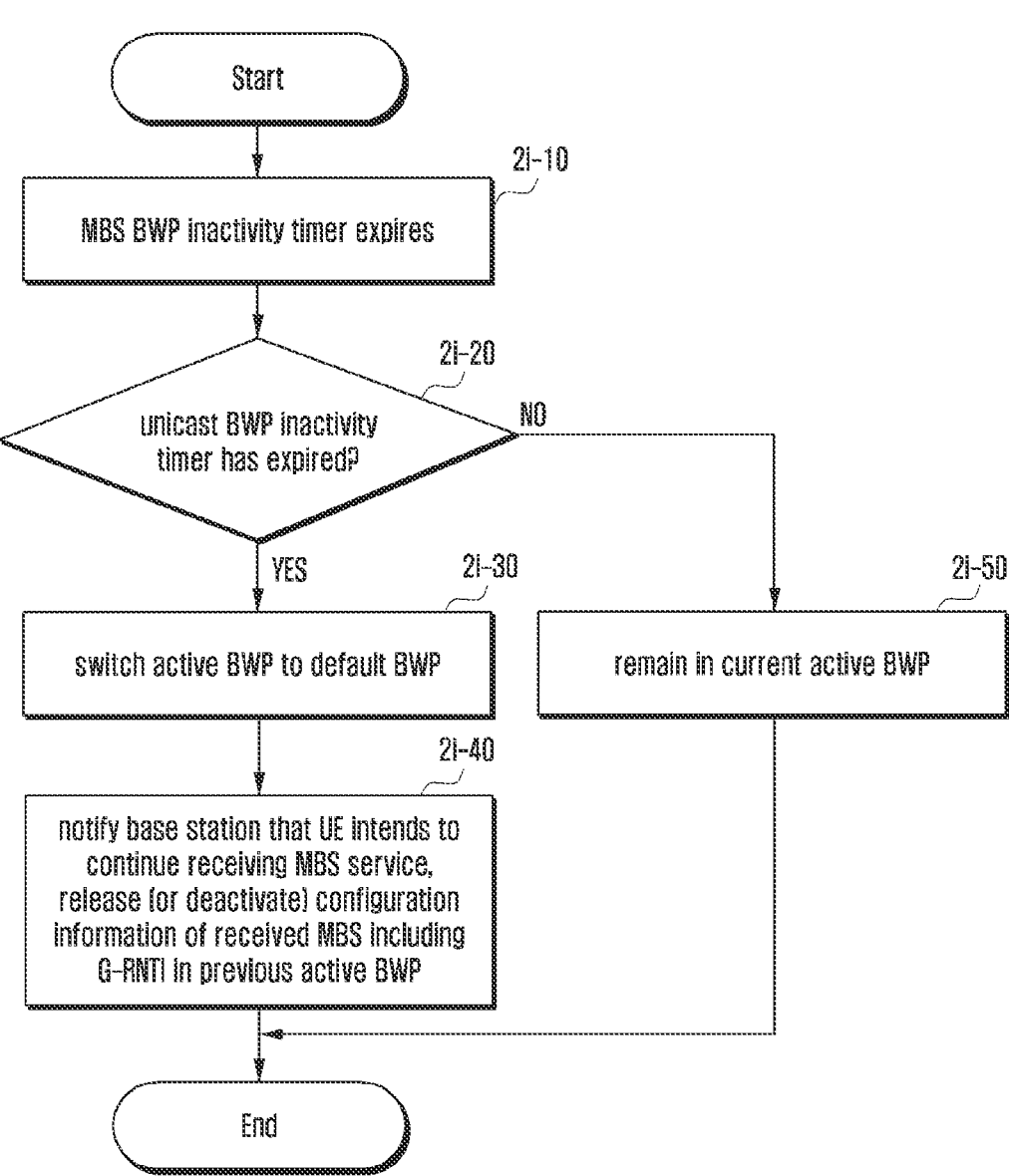

FIG. 2I illustrates an operation process when an MBS BWP inactivity timer and a unicast BWP inactivity timer coexist according to another embodiment of the disclosure. As described in FIG. 2G, when receiving a physical downlink control channel (PDCCH) allocated with a group-radio network temporary identifier (G-RNTI) for multicast and broadcast services (MBS), the UE may start the MBS bandwidth part (BWP) inactivity timer. If the UE is not only using an MBS service on the current active BWP but also performing unicast transmission and reception, the BWP inactivity timer defined for unicast can also operate together. When the MBS BWP inactivity timer expires in the medium access control (MAC) entity (2i-10), whether to switch the active BWP to the default BWP may depend on whether the unicast BWP inactivity timer has expired (2i-20). If the unicast BWP inactivity timer has also expired, as it means that data can no longer be transmitted or received on the current active BWP, the UE may switch the active BWP to the default BWP (2i-30). Then, the UE may transmit a list of MBS services of interest to the base station to inform the base station that it intends to continue receiving the MBS service. In addition, it is possible to release (or deactivate) configuration information of MBS being received including the G-RNTI configured in the previous active BWP (2i-40). Otherwise, if the MBS BWP inactivity timer has expired but the unicast BWP inactivity timer has not expired (2i-20), the UE may remain in the current active BWP (2i-50). Since this may mean that unicast transmission and reception is still in progress in the UE, the UE does not switch the active BWP to the default BWP.

Figure 2J:
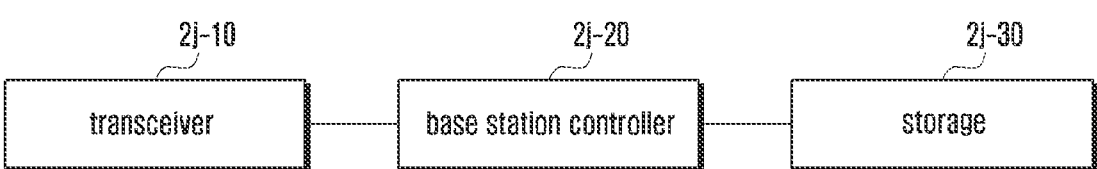
FIG. 2J is a diagram showing the structure of a base station according to an embodiment of the disclosure.

FIG. 2J is a diagram showing the structure of a base station according to various embodiments of the disclosure.

With reference to FIG. 2J, the base station may include a transceiver 2j-10, a controller 2j-20, and a storage 2j-30. In the disclosure, the controller 2j-20 may be defined as a circuit, an application-specific integrated circuit, or at least one processor.

The transceiver 2j-10 may transmit and receive signals to and from other network entities. For example, the transceiver 2j-10 may transmit system information to a UE and may transmit a synchronization signal or a reference signal.

The controller 2j-20 may control the overall operation of the base station according to various embodiments proposed in the disclosure. For example, the controller 2j-20 may control signal flows between blocks to perform operations according to the flowchart described above.

The storage 2j-30 may store at least one of information transmitted and received through the transceiver 2j-10 or information generated through the controller 2j-20.

Figure 2K:
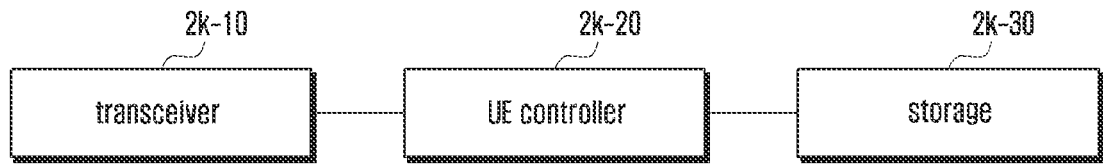
FIG. 2K is a diagram showing the structure of a UE according to an embodiment of the disclosure.

FIG. 2K is a diagram showing the structure of a UE according to various embodiments of the disclosure.

With reference to FIG. 2K. the UE may include a transceiver 2k-10, a controller 2k-20, and a storage 2k-30. In the disclosure, the controller may be defined as a circuit, an application-specific integrated circuit, or at least one processor.

The transceiver 2k-10 may transmit and receive signals to and from other network entities. For example, the transceiver 2k-10 may receive system information from a base station, and may receive a synchronization signal or a reference signal.

The controller 2k-20 may control the overall operation of the UE according to various embodiments proposed in the disclosure. For example, the controller 2k-20 may control signal flows between blocks to perform operations according to the flowchart described above.

The storage 2k-30 may store at least one of information transmitted and received through the transceiver 2k-10 or information generated through the controller 2k-20.

According to various embodiments of the disclosure, the operations of the embodiments of FIGS. 1A to 1F and FIGS. 2A to 2I described above may be performed in combination as long as they do not conflict with each other. For example, at least one operation for configuration/execution of DRX for MBS communication and at least one operation for configuration/execution of BWP deactivation may be performed in combination by a base station and/or a UE.

Accordingly, the base station described in FIGS. 1G and 2J may be a main agent, and the UE described in FIGS. 1H and 2K may also be a main agent.

The methods according to the embodiments described in the claims or specification of the disclosure may be implemented in the form of hardware, software, or a combination thereof.

When implemented in software, a computer-readable storage medium storing one or more programs (software modules) may be provided. The one or more programs stored in the computer-readable storage medium may be configured to be executable by one or more processors of an electronic device. The one or more programs may include instructions that cause the electronic device to execute the methods according to the embodiments described in the claims or specification of the disclosure.

Such a program (software module, software) may be stored in a random access memory, a nonvolatile memory such as a flash memory, a read only memory (ROM), an electrically erasable programmable read only memory (EE-PROM), a magnetic disc storage device, a compact disc ROM (CD-ROM), a digital versatile disc (DVD), other types of optical storage devices, or a magnetic cassette. Or, such a program may be stored in a memory composed of a combination of some or all of them. In addition, a plurality of component memories may be included.

In addition, such a program may be stored in an attachable storage device that can be accessed through a communication network such as the Internet, an intranet, a local area network (LAN), a wide LAN (WLAN), or a storage area network (SAN), or through a communication network composed of a combination thereof. Such a storage device may access the device that carries out an embodiment of the disclosure through an external port. In addition, a separate storage device on a communication network may access the device that carries out an embodiment of the disclosure.

In the embodiments of the disclosure described above, the elements included in the disclosure are expressed in a singular or plural form according to the proposed specific embodiment. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

Meanwhile, specific embodiments have been described in the detailed description of the disclosure, but various modifications are possible without departing from the scope of the disclosure. Therefore, the scope of the present disclosure should not be limited to the described embodiments, but should be defined by both the scope of the appended claims and their equivalents. For example, a base station and a terminal may be operated according to a result of combining parts of one embodiment and another embodiment of the disclosure. In addition, the embodiments of the disclosure can be applied to other communication systems, and other modifications based on the technical ideas of the embodiments may also be carried out.

The invention claimed is:

1. A method performed by a terminal in a wireless communication system, the method comprising:
receiving, from a base station, a radio resource control (RRC) message including information on a group-radio network temporary identifier (g-RNTI), wherein the g-RNTI is associated with a multicast broadcast service (MBS) multicast service;
receiving, from the base station, a physical downlink control channel (PDCCH) addressed to the g-RNTI for a multicast on an active bandwidth part (BWP);
starting a BWP inactivity timer associated with the active BWP;

in case that the BWP inactivity timer associated with the active BWP expires, identifying whether an MBS service that the terminal is interested in is configured in the active BWP:
in case that the MBBS service that the terminal is interested in is configured in the active BWP, remaining in the active BWP; and
in case that the MBS service that the terminal is interested in is not configured in the active BWP, switching to a default BWP.

2. The method of claim 1, wherein the RRC message further includes second information for configuring at least one BWP.

3. A method performed by a base station in a wireless communication system, the method comprising:
transmitting, to a terminal, a radio resource control (RRC) message including information on a group-radio network temporary identifier (g-RNTI), wherein the g-RNTI is associated with a multicast broadcast service (MBS) multicast service; and
transmitting, to the terminal, a physical downlink control channel (PDCCH) addressed to the g-RNTI for a multicast on an active bandwidth part (BWP),
wherein a BWP inactivity timer associated with the active BWP is started based on the PDCCH addressed to the g-RNTI,
wherein in case that the BWP inactivity timer associated with the active BWP expires and an MBS service that the terminal is interested in is configured in the active BWP, the terminal remains in the active BWP, and
wherein in case that the BWP inactivity timer associated with the active BWP expires and an MBS service that the terminal is interested in is not configured in the active BWP, the terminal switches to a default BWP.

4. The method of claim 3, wherein the RRC message further includes second information for configuring at least one BWP.

5. A terminal in a wireless communication system, the terminal comprising:
a transceiver; and
a controller coupled with the transceiver and configured to:
receive, from a base station, a radio resource control (RRC) message including information on a group-radio network temporary identifier (g-RNTI), wherein the g-RNTI is associated with a multicast broadcast service (MBS) multicast service,
receive, from the base station, a physical downlink control channel (PDCCH) addressed to the g-RNTI for a multicast on an active bandwidth part (BWP),
start a BWP inactivity timer associated with the active BWP,
in case that the BWP inactivity timer associated with the active BWP expires, identify whether an MBS service that the terminal is interested in is configured in the active BWP,
in case that the MBS service that the terminal is interested in is configured in the active BWP, remain in the active BWP, and
in case that the MBS service that the terminal is interested in is not configured in the active BWP, switch to a default BWP.

6. The terminal of claim 5, wherein the RRC message further includes second information for configuring at least one BWP.

7. A base station in a wireless communication system, the base station comprising:

a transceiver; and a controller coupled with the transceiver and configured to:

transmit, to a terminal, a radio resource control (RRC) message including information on a group-radio network temporary identifier (g-RNTI), wherein the g-RNTI is associated with a multicast broadcast service (MBS) multicast service, and transmit, to the terminal, a physical downlink control channel (PDCCH) addressed to the g-RNTI for a multicast on an active bandwidth part (BWP), wherein a BWP inactivity timer associated with the active BWP is started based on the PDCCH addressed to the g-RNTI for the multicast, wherein in case that the BWP inactivity timer associated with the active BWP expires and an MBS service that the terminal is interested in is configured in the active BWP, the terminal remains in the active BWP, and wherein in case that the BWP inactivity timer associated with the active BWP expires and an MBS service that the terminal is interested in is not configured in the active BWP, the terminal switches to a default BWP.

8. The base station of claim 7, wherein the RRC message further includes second information for configuring at least one BWP.

\* \* \* \* \*